US008070600B2

(12) United States Patent
Campo et al.

(10) Patent No.: US 8,070,600 B2
(45) Date of Patent: Dec. 6, 2011

(54) METHOD FOR PLAYING A GAME OF CHANCE WITH A WIRELESS ELECTRONIC GAMING UNIT

(75) Inventors: James A. Campo, Brunswick, OH (US); Gary Cooper, Kensington, MD (US)

(73) Assignee: E-Max Gaming Corporation, Cleveland, OH (US)

( * ) Notice: Subject to any disclaimer, the term of this patent is extended or adjusted under 35 U.S.C. 154(b) by 12 days.

(21) Appl. No.: 12/427,226

(22) Filed: Apr. 21, 2009

(65) Prior Publication Data

US 2009/0258692 A1 Oct. 15, 2009

Related U.S. Application Data

(63) Continuation of application No. 11/899,836, filed on Sep. 7, 2007.

(60) Provisional application No. 60/843,314, filed on Sep. 8, 2006.

(51) Int. Cl.
*A63F 13/02* (2006.01)
*A63F 9/24* (2006.01)

(52) U.S. Cl. ............................... 463/31; 463/16; 463/25

(58) Field of Classification Search .............. 463/17–19, 463/25, 30, 31, 40–42, 16
See application file for complete search history.

(56) References Cited

U.S. PATENT DOCUMENTS 2,853,304 A * 9/1958 Hooker ..................... 273/125 A
3,272,511 A * 9/1966 Zarich ....................... 273/141 A
4,213,524 A * 7/1980 Miyashita et al. ............ 194/211
4,355,806 A * 10/1982 Buck et al. ........................ 463/7
4,378,940 A 4/1983 Gluz et al.
4,475,157 A 10/1984 Bolan
4,624,462 A 11/1986 Itkis
4,651,995 A 3/1987 Henkel
RE32,480 E 8/1987 Bolan
4,747,600 A 5/1988 Richardson
4,768,151 A 8/1988 Birenbaum et al.
4,798,387 A 1/1989 Richardson
4,848,771 A 7/1989 Richardson
4,856,787 A 8/1989 Itkis
4,875,686 A 10/1989 Timms
5,007,649 A 4/1991 Richardson
5,043,887 A * 8/1991 Richardson ..................... 463/19
5,046,737 A 9/1991 Fienberg
5,054,787 A 10/1991 Richardson
5,072,381 A * 12/1991 Richardson et al. ............ 463/19
5,096,202 A 3/1992 Hesland
(Continued)

OTHER PUBLICATIONS

U.S. Appl. No. 60/843,314, filed Sep. 8, 2006, Campo, et al.
(Continued)

*Primary Examiner* — David L Lewis
*Assistant Examiner* — Matthew D. Hoel
(74) *Attorney, Agent, or Firm* — Fay Sharpe LLP

(57) ABSTRACT

A portable gaming unit for playing an associated game comprises a housing and a base. The housing includes a display. An electronics assembly is mounted in the housing for controlling input/output functions of the gaming unit. A pivot joint pivotably mounts the housing to the base. An easel is pivotably mounted to one of the housing and the base. The easel in a use orientation braces the housing against the base to enable the housing to maintain an acute angle in relation to a plane of the base. In a transport orientation, the easel allows the housing to fold against the base. The easel in the transport orientation serves as a handle for the gaming unit.

25 Claims, 16 Drawing Sheets

U.S. PATENT DOCUMENTS

| | | | | |
|---|---|---|---|---|
| 5,323,290 | A | 6/1994 | Blair | |
| 5,342,047 | A | 8/1994 | Heidel et al. | |
| 5,393,057 | A | 2/1995 | Marnell, II | |
| 5,396,399 | A | 3/1995 | Blair | |
| 5,407,200 | A | 4/1995 | Zalabak | |
| 5,511,205 | A | 4/1996 | Kannan et al. | |
| 5,542,669 | A * | 8/1996 | Charron et al. | 463/13 |
| 5,547,192 | A * | 8/1996 | Ishibashi | 463/26 |
| 5,632,373 | A | 5/1997 | Kumar et al. | |
| 4,857,787 | A | 9/1997 | Itkis | |
| 5,967,894 | A * | 10/1999 | Kinoshita et al. | 463/13 |
| 5,967,895 | A | 10/1999 | Kellen | |
| 6,174,234 | B1 * | 1/2001 | Seibert et al. | 463/20 |
| 6,346,045 | B2 | 2/2002 | Rider et al. | |
| 6,354,941 | B2 | 3/2002 | Miller et al. | |
| 6,581,935 | B1 | 6/2003 | Odom | |
| 6,636,420 | B2 | 10/2003 | Nakano | |
| 6,645,072 | B1 | 11/2003 | Kellen | |
| 6,651,943 | B2 | 11/2003 | Cho | |
| 6,656,048 | B2 | 12/2003 | Olsen | |
| 6,729,959 | B1 | 5/2004 | Moore et al. | |
| 6,743,098 | B2 | 6/2004 | Urie et al. | |
| 6,769,069 | B1 | 7/2004 | Nguyen | |
| 6,769,991 | B2 | 8/2004 | Fields | |
| 6,923,720 | B2 * | 8/2005 | Loose | 463/16 |
| 6,942,572 | B2 * | 9/2005 | Inoue | 463/20 |
| 2002/0094871 | A1 * | 7/2002 | Luciano et al. | 463/43 |
| 2002/0142830 | A1 * | 10/2002 | Adams | 463/20 |
| 2003/0064805 | A1 | 4/2003 | Wells | |
| 2003/0109304 | A1 * | 6/2003 | Gauselmann | 463/30 |
| 2003/0181234 | A1 | 9/2003 | Falciglia | |
| 2003/0190958 | A1 | 10/2003 | Paulsen | |
| 2004/1003383 | | 2/2004 | Chao | |
| 2004/0053663 | A1 | 3/2004 | Paulsen | |
| 2004/0077400 | A1 | 4/2004 | Marshall | |
| 2004/0087351 | A1 | 5/2004 | Paver et al. | |
| 2004/0117678 | A1 | 6/2004 | Soltis, Jr. et al. | |
| 2004/0121797 | A1 | 6/2004 | Gupta | |
| 2004/0122867 | A1 | 6/2004 | Drews | |
| 2004/0152508 | A1 | 8/2004 | Lind et al. | |
| 2005/0026670 | A1 | 2/2005 | Lardie | |
| 2005/0059467 | A1 * | 3/2005 | Saffari et al. | 463/19 |
| 2005/0096121 | A1 * | 5/2005 | Gilliland et al. | 463/20 |
| 2007/0270206 | A1 | 11/2007 | Snoddy et al. | |
| 2008/0214273 | A1 | 9/2008 | Snoddy et al. | |

OTHER PUBLICATIONS

U.S. Appl. No. 10/409,718, filed Apr. 9, 2003, Campo, et al.
U.S. Appl. No. 11/899,836, filed Sep. 7, 2007, Campo, et al.

* cited by examiner

METHOD FOR PLAYING A GAME OF CHANCE WITH A WIRELESS ELECTRONIC GAMING UNIT

CROSS REFERENCE TO RELATED APPLICATIONS

This application claims priority from U.S. Provisional Patent Application Ser. No. 60/843,314, filed Sep. 8, 2006, and is a continuation of U.S. application Ser. No. 11/899,836, which was filed on Sep. 7, 2007 and is still pending, the disclosures of which are incorporated herein in their entireties by reference.

BACKGROUND

The present invention relates to electronic gaming units. More particularly, the present invention relates to an electronic gaming unit which is interactive with a gaming console and a point of sale console for selling games, such as games of chance, during or prior to a gaming session. While bingo is particularly discussed herein, it should be appreciated that the gaming unit can be used for a variety of other games, such as Keno or the like. In one embodiment, the gaming unit is part of a system of multiple spaced wireless gaming units that are used to play games of chance, such as bingo, when game information is provided by a central gaming machine, such as a bingo console in communication with the wireless gaming units.

The game of bingo commonly involves a group of players and a caller, who announces randomly selected indicia, which commonly comprise integral numbers within a predetermined range, i.e. 1-75. For Keno, the numerical range could be 1-90. Bingo players typically play several cards at a time, up to eighteen or more cards, in order to increase their odds of winning. Manually playing multiple cards can be tedious, however, leaving one tired or prone to errors. With paper bingo faces there is also the possibility of cheating, i.e. bingo players attempting to alter the numbers on the paper, or using bingo paper from an earlier session.

There have been many attempts in the prior art to provide a system for electronic play of a bingo session. The systems generally include electronic gaming units which aid a player in playing bingo games. Such gaming units may assist a player in overseeing more bingo cards than would be possible or practical otherwise.

In particular, U.S. Pat. No. 4,475,157 discloses a system including a gaming unit, where between each game the player must manually enter each number from each card into the memory unit. The manual entry, however, is slow and tedious, and creates a practical limitation on the number of bingo cards that can be entered before and between bingo game sessions.

U.S. Pat. No. 4,768,151 discloses a system including a gaming unit that provides for the creation of whole playing cards simply by the manual entry of a card identification number. This process improves the speed of entering the selected cards into the game piece memory, but requires the cooperation of bingo card manufacturers to provide identification numbers for their cards such that each identification number is associated with one specific pattern of numbers on a card.

Both of the above approaches are simply methods for assisting a player in an otherwise traditional, manual game of bingo. Therefore, improvements to these systems would be desirable.

On the other hand, electronic gaming systems have been developed, where each player is equipped with a gaming unit and the use of paper playing cards is either eliminated or at least reduced. These systems typically include a central computer which performs administrative tasks including sale of bingo cards, running the bingo game, and sometimes electronic payment to the winners. In connection therewith, players sit at hard-wired electronic bingo stations or may be given wireless gaming units, through which the players are provided with the desired number of card configurations for each game.

U.S. Pat. Nos. 4,856,787 and 5,043,887 disclose hard-wired or network electronic bingo systems where a central computer communicates with each remote unit before and during the bingo game. All purchases and all game-related data may be communicated through communication lines between the central computer and the remote units. The drawbacks of these games include the resultant undesirable "Las Vegas" feel of the game, the general lack of portability of the system, the lack of portability of the individual playing units, and the complications that can arise from maintaining a computer network system.

The wireless gaming unit approach marries the best of all of the above approaches. The typical system includes a central computer, which administers the game. The player purchases a number of games to be played and a number of bingo faces to be played in each game. The computer generates the playing card information and downloads the information into the gaming unit. A player carries the gaming unit in much the same way as the player would carry one or more bingo cards or sheets in a traditional bingo game. Throughout the bingo games, the player optionally inputs the called numbers into the gaming unit through a keypad or a touchscreen, and the gaming unit alerts the player if one or more of the stored cards achieve a winning sequence. This approach retains the feel of a traditional bingo game, including the fact that the player carries away the purchased bingo cards, in the portable unit, and can enter the called numbers manually.

Currently available portable or hand held gaming units are not optional for a number of reasons. First, the screen is not set at the correct viewing angle. Second, the player is provided with either a keypad or a touchscreen, but not both in the same unit. Third, the current designs are not movable from a use position to a transport position and vice versa. Fourth, they do not have an optimized power management system. Fifth, they do not allow a player to identify himself to the gaming unit in a time-efficient manner. Sixth, the current gaming units are not optimized in other ways that would be useful for gaming.

Current electronic bingo systems which use wireless gaming units also require some means of downloading or configuring each gaming unit before each session of play. This configuration generally includes loading the number and description of bingo cards purchased by the player, the type of win pattern and variation of bingo game for each game of the playing session, and other game options. Also, as the play software is updated with a newer version, the updates have to be delivered to each gaming unit. Such downloading of information typically uses some form of wired or wireless, communication link which configures the gaming unit at the point-of-sale cashier station when the player enters the bingo hall.

As the capability of electronic technology and the displays used in such portable gaming units increases, it becomes possible for the gaming units to play games and attractions other than bingo, or more than one type of game at a time. Many of these games will allow the player to accumulate prize winnings and other information. At the end of play, this information must be transferred from the gaming units back to a central computer station to allow for payment of prizes or other accounting of winning information.

All of these requirements of loading game information to the gaming unit at the start of play and reading prize information after play require significant amounts of handling and transportation of the gaming units in the bingo hall. Since a single bingo hall can contain hundreds of such units, the handling of the portable gaming units for updating purposes is a significant problem for the bingo operators and also frequently leads to damage of the units due to rough handling or dropping when carrying the units.

Accordingly, it has been considered desirable to develop a better hand held or portable gaming unit, together with a system which efficiently meets the requirements of administering a game, increases the efficiency of updating software on the gaming units and which minimizes the handling requirements for the gaming units.

SUMMARY

In accordance with one aspect, a portable gaming unit for playing an associated game comprises a housing and a base. The housing includes a display. An electronics assembly is mounted in the housing for controlling input/output functions of the gaming unit. A pivot joint pivotably mounts the housing to the base. An easel is pivotably mounted to one of the housing and the base. The easel in a use orientation braces the housing against the base to enable the housing to maintain an acute angle in relation to a plane of the base. In a transport orientation, the easel allows the housing to fold against the base. The easel in the transport orientation serves as a handle for the gaming unit.

In accordance with another aspect, a portable gaming unit for playing a game over a secure network comprises a housing and a base connected to the housing. The housing includes a display. An electronics assembly is mounted in the housing for controlling input/output functions of the gaming unit. An alerting device is mounted to one of the housing and of the base for indicating at least one of a game win condition at an end of a first game within a gaming session and a request for help from a game proprietor. The alerting device is configured as an operational element during of a second game within the gaming session.

In accordance with yet another aspect, a portable gaming unit for playing a game over a secure network comprises a housing and a base connected to the housing. The housing includes a display. An electronics assembly is mounted in the housing for controlling input/output functions of the gaming unit. A battery and a battery control system is mounted to one of the housing and the base for regulating an operation of the gaming unit. The gaming unit receives information from the network regarding required duration of play for an entire gaming session. The battery control system prevents initiation of a gaming session on the gaming unit if there is inadequate power for the entire gaming session.

The present invention encompasses a uniquely featured and improved portable, RF wireless networked, electronic gaming unit (RGU) capable of playing Bingo and other games. One or more RGUs can be directly controlled by a joint combination of a Bingo Console (Console) and Point of Sale (POS) via a network. Thus, a secure, accurate, integrated bingo system can be formed. The Console can have an integrated bingo ball blower and ball number display camera. The Console can directly drive flashboards and video monitors, and can incorporate a bingo card verification means. The Console and POS can be in direct communication with each other and the Console can directly communicate with the RGU before, during, and after gaming via a secure wireless RF network.

The Console and POS can interactively accomplish the loading of specific purchased gaming data, relative to each specific player, into and out of each specific RGU used by each player, via an RF wireless communication channel. Via the network, the Console can control the POS and RGU with game management functions such as starting and ending of a bingo session, transferring of accurate payout information, and calling bingo balls. The POS sends player and sales information to the Console as required. The Console and RGU can have a means to automatically conduct live inventory of all RGUs resident in the bingo facility during gaming and have knowledge if each RGU was loaded with purchased gaming information for the session. The Console, POS, and RGU can contain logic and data that when interactively applied with real time communication during gaming between the three elements of the system, prevent the system from violating certain critical regulations imposed by regulatory agencies. The Console, POS, and RGU can each have built in security for player and management access.

The RGU includes a combination of several unique mechanical, electrical, and program features resulting in improved operation for both players and game operators over current products in the marketplace. The RGU can have a convenient means that supports a security system with player tracking and player credits, and can have means to safeguard against battery power failure for the session duration. In one embodiment, the RGU includes means for seamless combination of a touch panel on a display with an attached keyboard that are relatively positioned in different vertical and horizontal planes. Also, the RGU can incorporate dual computing elements to achieve multiple modes of game play, suspend, low power, and transport mode, all states having distinct characteristics concerning the responses to network commands, gaming operations, player inputs, and RGU power consumption. Alternately, the RGU has means to provide gaming operators the option to easily convert battery power to AC line power and that also prevents loss of purchased gaming data and point of program execution when momentary AC line power interruptions occur.

BRIEF DESCRIPTION OF DRAWINGS

The present invention may take physical form in certain parts and arrangements of parts, embodiments of which will be described in detail in the specification and illustrated in the accompanying drawings which form a part hereof. In the drawings.

DETAILED DESCRIPTION

Figure 1:
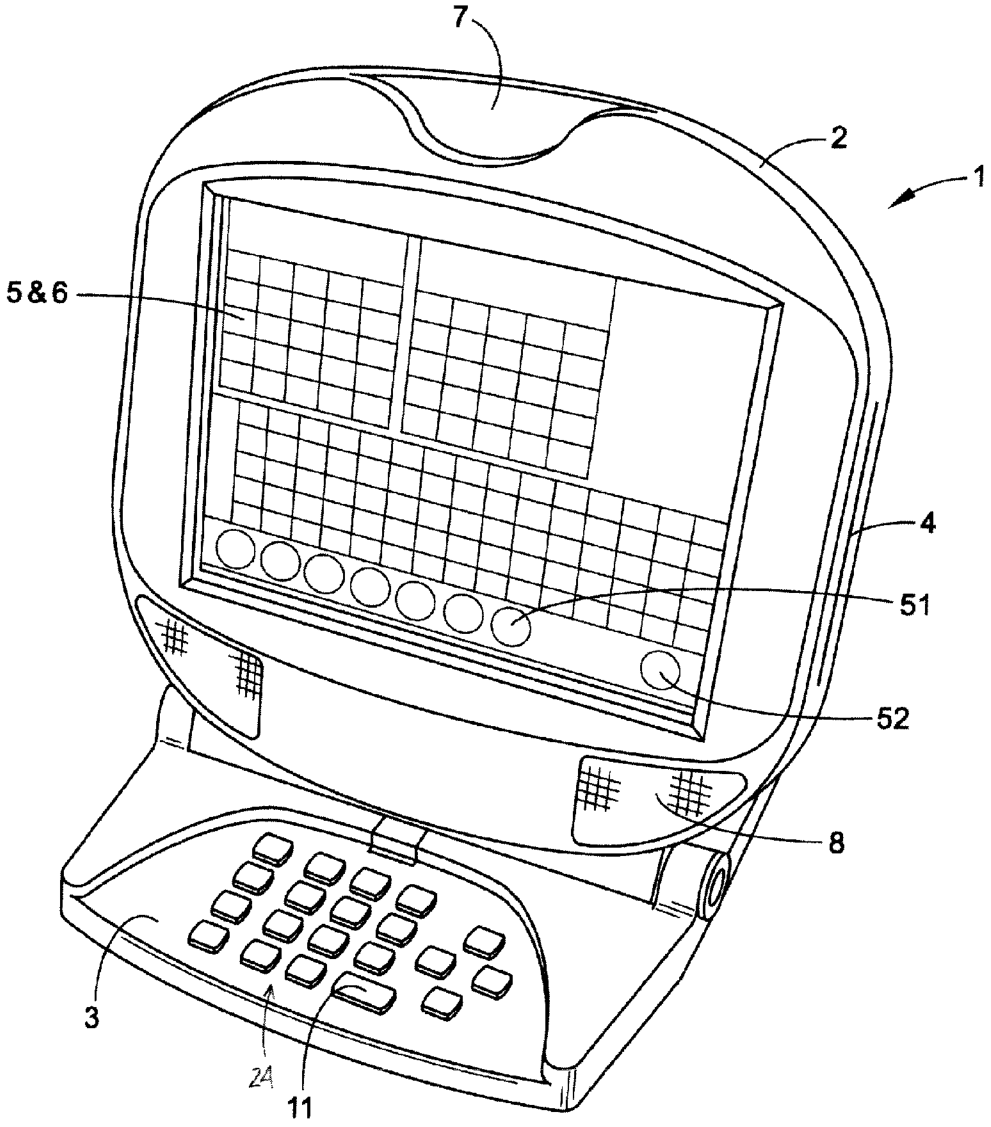
FIG. 1 is the front perspective view of a first embodiment of an RGU and illustrating several mechanical features, while shown in the game playing position.

It should, of course, be understood that the description and drawings herein are merely illustrative and that various modifications and changes can be made in the structures and components disclosed without departing from the spirit of the instant disclosure. The description sets forth an embodiment of a gaming unit and the functions and the sequence of steps for administering a game. In the illustrated embodiments, the system is intended to play a game of bingo or other types of games of chance. However, it is to be understood that the same or equivalent functions and sequences may be accomplished by different embodiments that are also intended to be encompassed within the spirit and scope of the present invention.

Feature: Display, Touch Panel, Keyboard

Similar portable, wireless, Bingo gaming products currently in the marketplace, generally offer touch panel only, keyboard without touch panel, a touch panel with a limited set of awkwardly placed keys in the same vertical plane as the touch panel, or a two piece configuration with a touch panel and a detached keyboard. Most gaming units are touch only and place a simple pivot rod on the back of the unit that places the unit at a forty-five degree (45°) angle to the table top. This angle is required to establish a mechanically stable touch panel surface to support the forces exerted by the player on the touch panel. This angle also results in considerable glare on the display from overhead lighting in the facility. Some products have the display and keyboard in the same plane which makes the player angle of keyboard entry awkward or results in poor viewing angles of the display. The inclusion of a full set of keys needed for gaming (on the order of twenty) in the same plane as the display makes the gaming unit too large or places the reduced size keys in unconventional positions making key entry difficult for the player, so most products avoid this configuration. Some gaming units offer a laptop computer style package with the display in the upper lid that can be placed at a player convenient viewing angle and the keyboard in the attached base. Like laptops, they contain no touch screen because the top lid is not a stable surface to accommodate the forces exerted by the player on the touch panel. The two piece keyboard configuration has the disadvantage of battery replacement cost or recharging logistics, additional effort of collecting the keyboard after each bingo session, and the additional space needed for storage. These serious limitations cause common complaints from Bingo players that are of extreme diversity in the preference of touch, keyboard, or combination thereof in operating a gaming unit and also complaints from gaming operators that must handle, charge, and repair the units. The angle at which the player enters data into a gaming unit is important to the player that has become accustomed to using a standard horizontally oriented desktop computer keyboard and experiencing a good viewing angle on a vertically oriented display.

Figure 2:
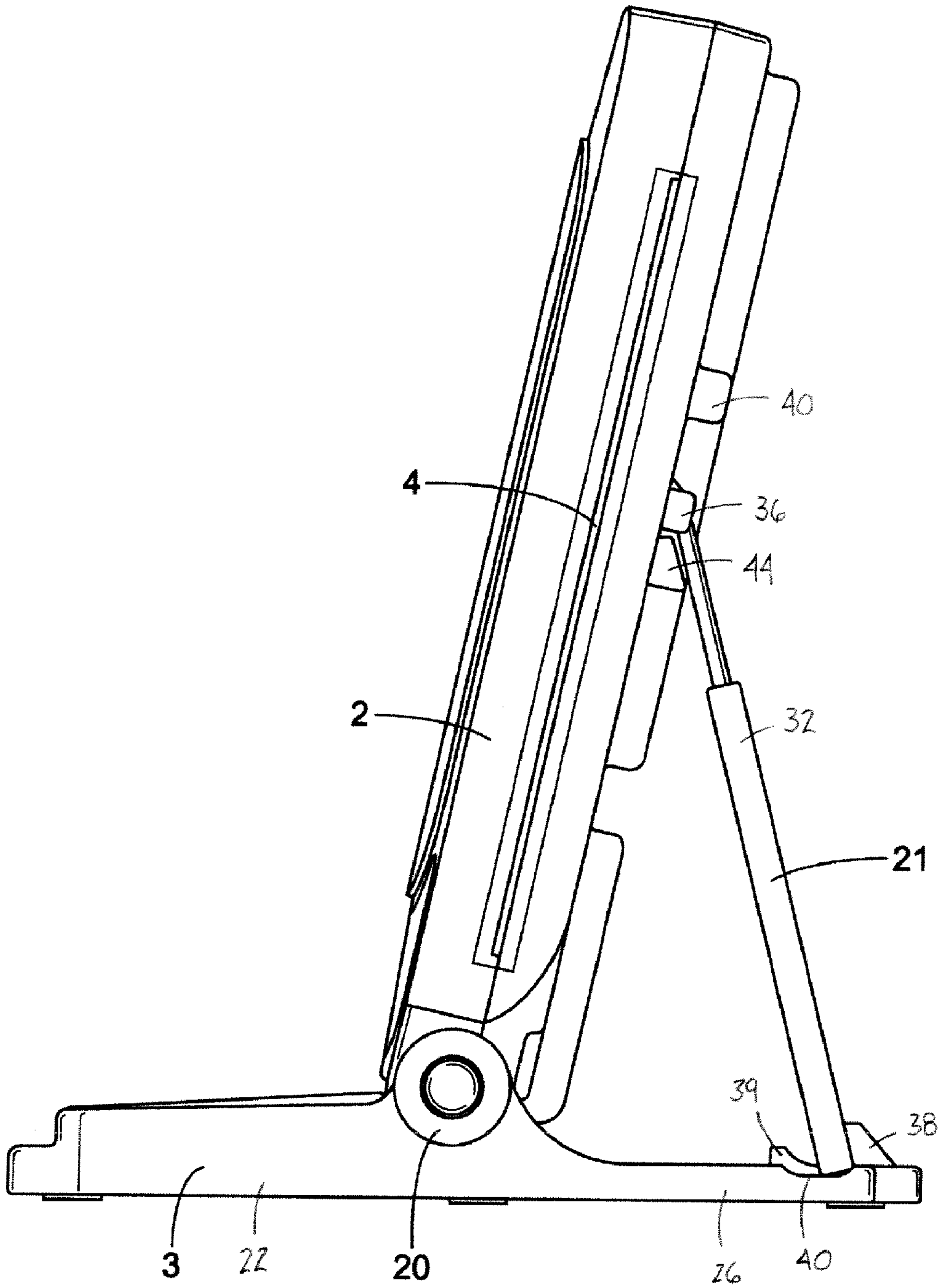
FIG. 2 is the right side elevational view of the RGU of FIG. 1.
Figure 3:
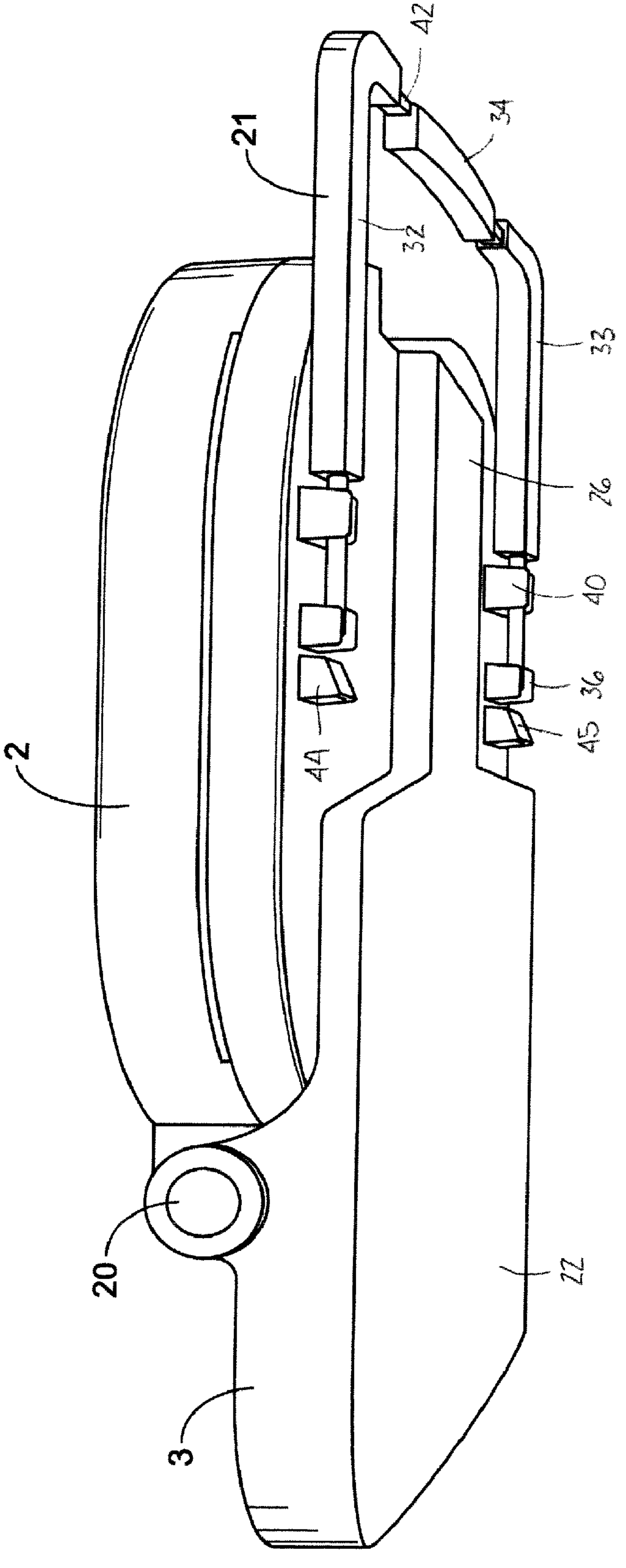
FIG. 3 is the right side perspective view of the RGU of FIG. 1, shown in the transport position.

With reference to FIGS. 1-3, a portable, RF wireless networked, electronic gaming unit (RGU) 1 according to the present invention offers the best of all offerings. The RGU 1 comprises a housing 2 and a base 3 pivotally attached to the housing 2. The base includes a first section 22 comprising a keyboard 24 and a second section 26. The attached keyboard 24 significantly improves reliability and is desired by the gaming operators to reduce cost and improve handling of the units over two piece solutions employing a detached keyboard. The housing houses a display 6 which can be a color LCD touchscreen graphic display of the game in play. Typically, a touchscreen sensor is overlaid on the displayable surface of the display thereby creating a touch panel 5. Although, it should be appreciated that the display can incorporate a built-in touch panel (internal vs. external). To activate the touch panel, a stylus may be used, but most players will likely use their fingers.

The keyboard 24 and touch panel 5 operate seamlessly and interchangeably to the player. Thus, it should be appreciated that the RGU can function without the keyboard, with only the touch display 5. The keyboard 24 includes a plurality of keys 11 which make gaming pleasurable. In use, the housing 2 and keyboard 24 (base 3) are located in respective generally vertical and horizontal planes thereby making viewing of the display 6, operation of the touch panel 5, and keying very convenient to all players of various preferences.

The RGU 1 includes a carrying handle 21 mounted to one of the housing 2 and the base 3 for carrying of the RGU in a transport position or transport orientation. As shown in FIG. 3, the handle is generally U-shaped and includes a pair of side legs 32 and 33 and a central leg 34 interconnecting the side legs. The side legs are pivotally mounted to the housing 2 via swivel joints 36. Although, it should be appreciated that alternative means for pivotally mounting the handle are contemplated. The housing further includes a pair of clips 40 which are configured to releasably engage the side legs 32, 33 of the U-shaped handle to maintain the handle 21 in the transport position.

With reference to FIG. 2, in a use position or use orientation, the handle 21 deploys as an easel or back support for the display/touch panel (housing 2) during gaming. Particularly, the central leg 34 of the U-shaped handle 21 cooperates with first and second flanges 38 and 39, respectively, located on the base 3 while seated in a recessed portion 40 forward of the first flange. The flanges engage a cut-out portion 42 of the central leg. The recessed portion 40 prevents the handle from sliding forward (toward the pivot 20) while the touch panel 5 is being used. Shoulders 44 are provided on the housing 2. Each shoulder includes an angled face 45 for supporting the side legs 32, 33 in the use position. The handle 21 when used as a back support for the housing 2 provides a stable touch panel surface and maintains an acute angle in relation to a plane defined by the base thereby optimizing the display viewing angle to significantly reduce glare from overhead lighting. To move the handle 21 to the transport orientation, the housing is rotated more upright which disengages the central leg 34 from the first and second flanges 38, 39. The handle is then rotated away from the base 3 until the side legs 32, 33 are engaged by the clips 40.

Because of the large number of gaming units commonly used in a Bingo hall (up to 1,000), the RGU must be compact enough to fit into small profile charging racks to conserve floor space. To this extent, the base 3 pivots relative to the housing 2 via a hinge 20 (FIG. 2) such that it stores in-plane with the housing when not used for game play (FIG. 3). This results in a thin profile product that is easily stacked and transported or inserted in compact charger racks.

Figure 7:
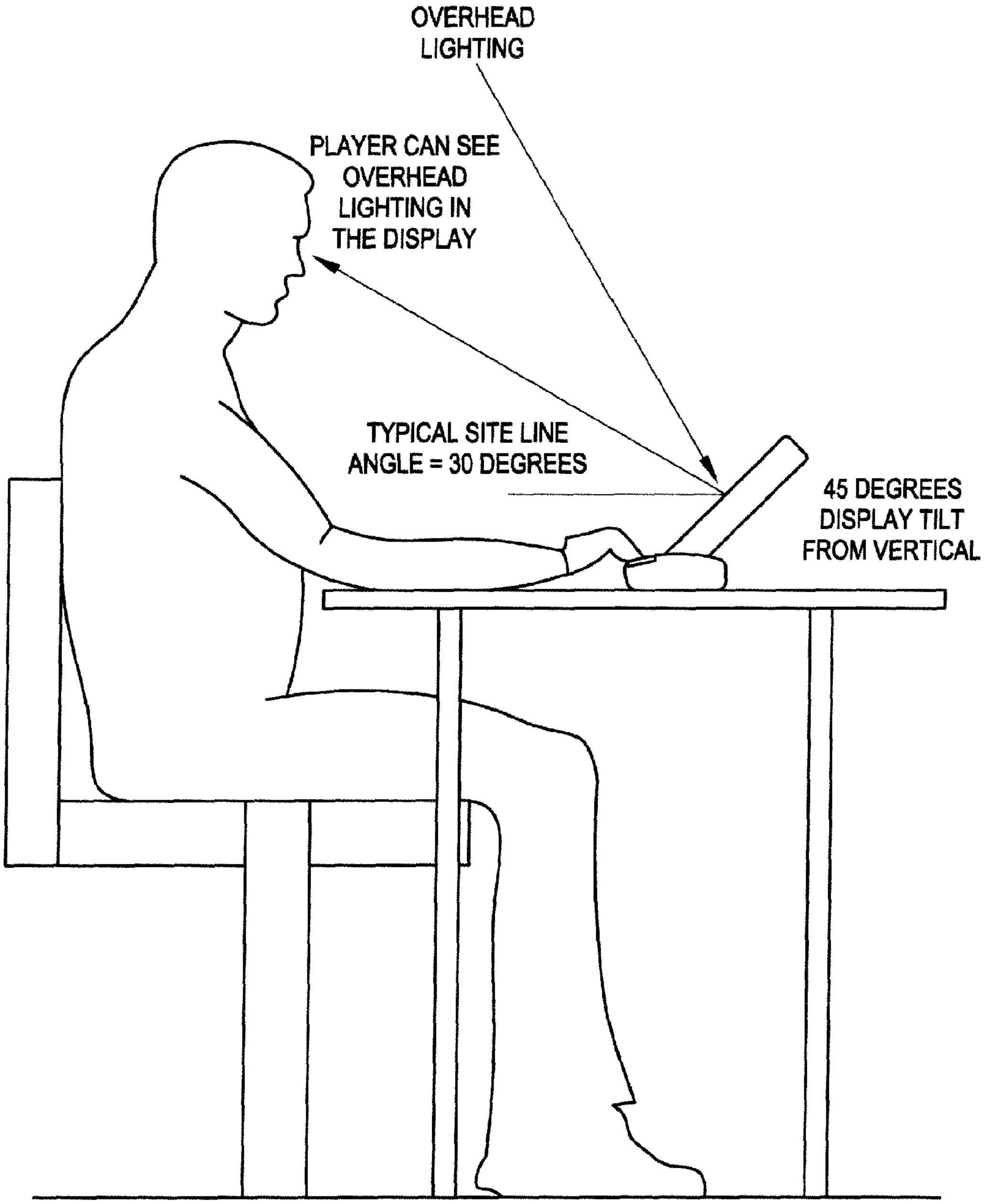
FIG. 7 is a schematic illustration of a model of optical paths for overhead lighting glare on a conventional gaming unit display screen typically found in the marketplace.
Figure 8:
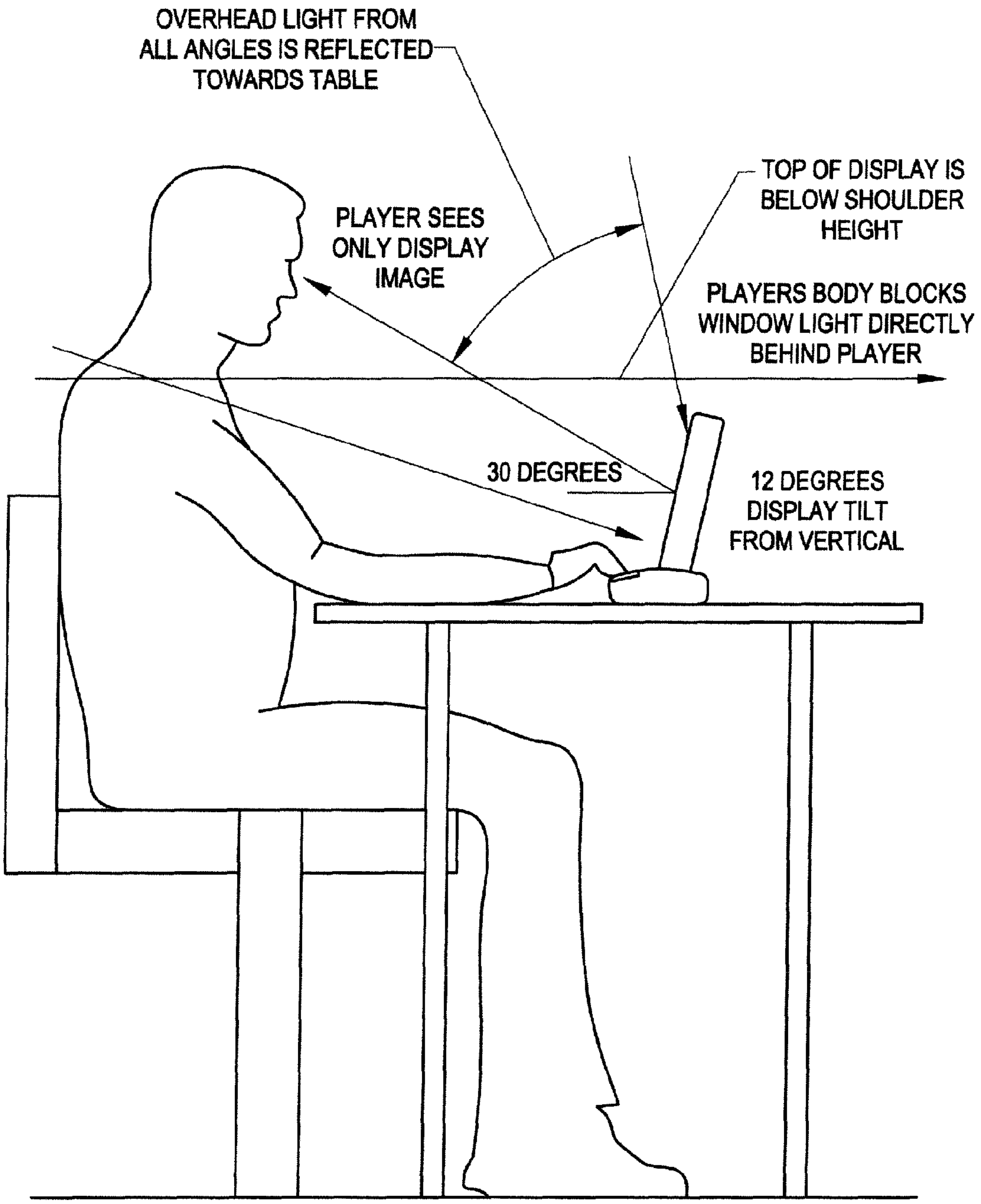
FIG. 8 is a schematic illustration of the optimized viewing angle used by the RGU according to the instant disclosure which greatly reduces or eliminates overhead lighting glare.

Similar portable, wireless, Bingo gaming products currently in the marketplace generally use simple support rods that provide a fixed angle of approximately forty-five degrees (45°) to a table top or allow a variable display angle of the gaming unit to fall within a large range of viewing angles that create unstable touch panel operations. Ultimately these approaches result in player dissatisfaction because gaming information on the display is obstructed by the reflected image of the overhead fluorescent lighting, as shown in FIG. 7. The wide range of viewing angles also result in the players perception of poor display quality because the displays are comprised of low cost color LCD technology that has known deficiencies over large viewing angles. The simple support rods are inadequate, unstable support for touch panel operations and result in an improper touch panel operator angle for convenient touch panel operation. As shown in FIG. 8, the RGU 1 fixes the viewing angle at a near optimum value in a vertical orientation (approximately twelve degrees (12°)), thereby greatly reducing overhead lighting images, and negating the perception of color LCD viewing angle deficiencies. As shown in FIG. 2, the fixed viewing angle is achieved with the handle 21 functioning as a sturdy easel that securely supports the forces of a player's display touch panel operation. The near vertical, fixed angle eliminates parallax between the touch panel 5 and the display image. The handle 21 also folds into a flat position relative to the housing for transporting and insertion in chargers, as shown in FIG. 3. For player convenience, the keyboard is also slanted at approximately eleven degrees (11°) as are most desktop computer keyboards.

Feature: Integrated Multilevel Security and Player Tracking, Lock and Play

Similar portable, wireless, Bingo gaming products currently in the marketplace generally do not offer an integrated magnetic card reader, or smart card reader, or biometric security devices. Players are required to key enter a series of numbers into the gaming unit from a receipt, to enable their gaming unit for play or key a series of numbers from their credit card to obtain monetary credits for gaming. Key entry errors often result in the wrong gaming information being loaded or result in many interactive and frustrating attempts to achieve credit operations. In many cases, game operators are needed to assist players and undo errors that have occurred. The lack of sufficient security on current gaming units allows other unauthorized players to tamper with the units in the momentary absence of the player. For controlled player access, some products offer an external magnetic card reader which is vulnerable to security attacks.

The RGU 1 integrates into the gaming unit housing a tamper proof (by virtue of housing integration, FIG. 2) magnetic card reader, or smart card reader 4. Alternatively, an integrated biometric reader can be employed. The RGU reader is very convenient for players to use their special encoded player tracking cards (similar to those used in Casinos) or thumb biometric to enable their RGU for play without key entry errors, or use their existing credit cards to easily and accurately obtain monetary credits. The system can discriminate between player cards, management cards, credit cards, and other types of custom cards. The integrated reader(s) 4 and use of these cards simultaneously provides a security means that accurately identifies the player to the gaming operators. The RGU also has a lock button 51 and associative software that allows the player to disable the keyboard and touch panel entry and removes the gaming display to prevent unauthorized tampering of the unit during momentary absence. The player must use his card to unlock the RGU and return it to a normal gaming screen. Unlike other products in the marketplace, the improved RGU also has a unique feature in that it continues to play bingo and will alert the player of a win condition even when the unit has been placed in the locked state. These error and tamper free methods dramatically reduce the need for assistance from the gaming operators, thereby enhancing legal operations and reducing cost of operations when large Bingo halls have over 1,000 players to attend to during a Bingo game. RGU players have the important advantage of not missing a win when the RGU is in a locked, tamper proof state. This is extremely important in light of portable gaming in the secure Casino marketplace where a remote gaming unit located outside of the immediate Casino floor may be accessible by under-aged children, resulting in illegal gaming.

Another advantage of the reader security system on the RGU is that a special card and password can be employed for managers of the gaming operations to check proper and legal operation of the RGUs during gaming. Keystroke logs, purchased gaming data, proper unit operation, and many other types of information can be displayed when the manager uses his card and password. The use of a player card can never expose this diagnostic/management information to the player, and likewise, the manager can not perform gaming related functions of a player. The lack of this type of security on current units in the marketplace often exposes sensitive management functions and legal information to the players during the course of normal gaming. For additional security, in conjunction with the Console, a unique manager password can be entered at the Console for each individual session and it is dynamically downloaded into the RGU with the purchased gaming data.

Feature: Large Gaming Indicator

Figure 9:
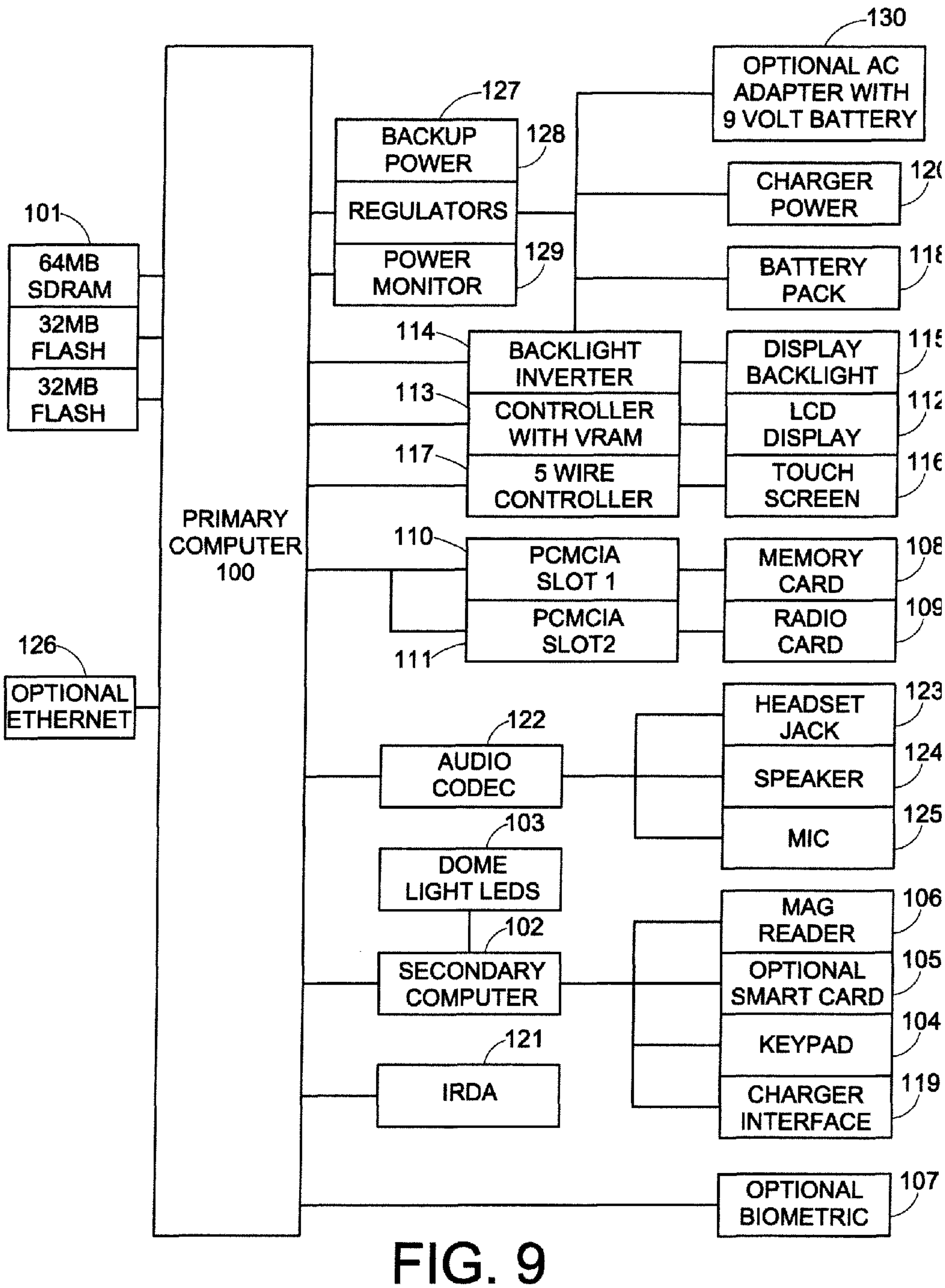
FIG. 9 is an internal block diagram of the electronics of one embodiment of the RGU.

Similar portable, wireless, Bingo gaming products currently in the marketplace do not have a large indicator that can be seen from a distance. Bingo halls supporting many players are often quite large (over 26,000 square feet). When a player needs assistance or has won, he must yell, stand up, or raise his hand to get gaming operator attention. As shown in FIG. 1, the RGU 1 includes an alerting device such as a dome light assembly 7 including a lens which houses at least one indicator light, such as Green and Red light-emitting diodes (LEDs) 103 (FIG. 9). When illuminated, the light assembly can easily be seen anywhere within a 26,000 square foot facility. When both LEDs are illuminated, a yellow light is produced. In support of the LEDs, the RGU 1 includes a player assistance button 52 that activates the at least one of the LEDs, preferably the Red LED, providing an easy and convenient method for a gaming operator to locate a player that needs assistance. When the RGU 1 self detects a game win condition, the other LED, preferably the Green LED, is automatically activated to make it easy for the gaming operator to locate the winning player for purposes of win verification and payout.

The light assembly 7 can also be used in a raffle-like game, which is not a game of player skill or a game that interacts with a bingo game. To play the raffle game, the Console, via the network, instructs all RGUs to turn on their light assemblies 7 and blink the LEDs at random times on random units, with random colors of red, green, and yellow. After a predetermined period, the Console randomly reduces the number of RGUs blinking one at a time until there is only one RGU illuminating a red color, only one RGU illuminating a green color, and only one RGU illuminating a yellow color. As determined prior to the raffle, the colors denote first, second and third prize winners. The raffle can be played on Auto, Semi-Auto, and Manual E-max modes (which will be described in greater detail below). The raffle can be played at any time, but not during a specific bingo game. A player generally participates in the raffle by purchasing at least one raffle chance for one level (i.e., one specific color). Multiple chances can be purchased at a single level, which increases the chance of winning that level. A single RGU generally can only buy in at one level. When purchased, each raffle chance is linked to a specific electronic receipt number and ID printed on a receipt for a purchased bingo package. The IDs are only loaded into the Console, and the more chances you purchased, the more times your ID is loaded. All raffle gaming logic is resident on the Console, not the RGUs. A payout amount for each level or color is automatically calculated based on raffle sales dollars collected up to the point the game starts. On a winning unit, a worker can compare the ID on the Console with the ID displayed on the display 6 and printed on the receipt. The winners can then be paid from the raffle game entry proceeds.

It can be appreciated that many other games can be devised and played using a large dome gaming indicator that can be easily seen in a large facility by both players and gaming operators, and that is network controlled by a gaming Console or even locally controlled for gaming purposes by the RGU itself. This improved location and gaming means, yields faster games and less overhead for gaming operators, while adding new player games made possible by the large dome light. The players also enjoy a large win light on their bingo gaming unit similar to what they experience and enjoy when they win on slot machines. The RGU is also capable of producing sounds, via speakers 8, that imitate the dropping of coins so familiar with slot machines.

Feature: Plug-in Memory and Radio Cards

Figure 4:
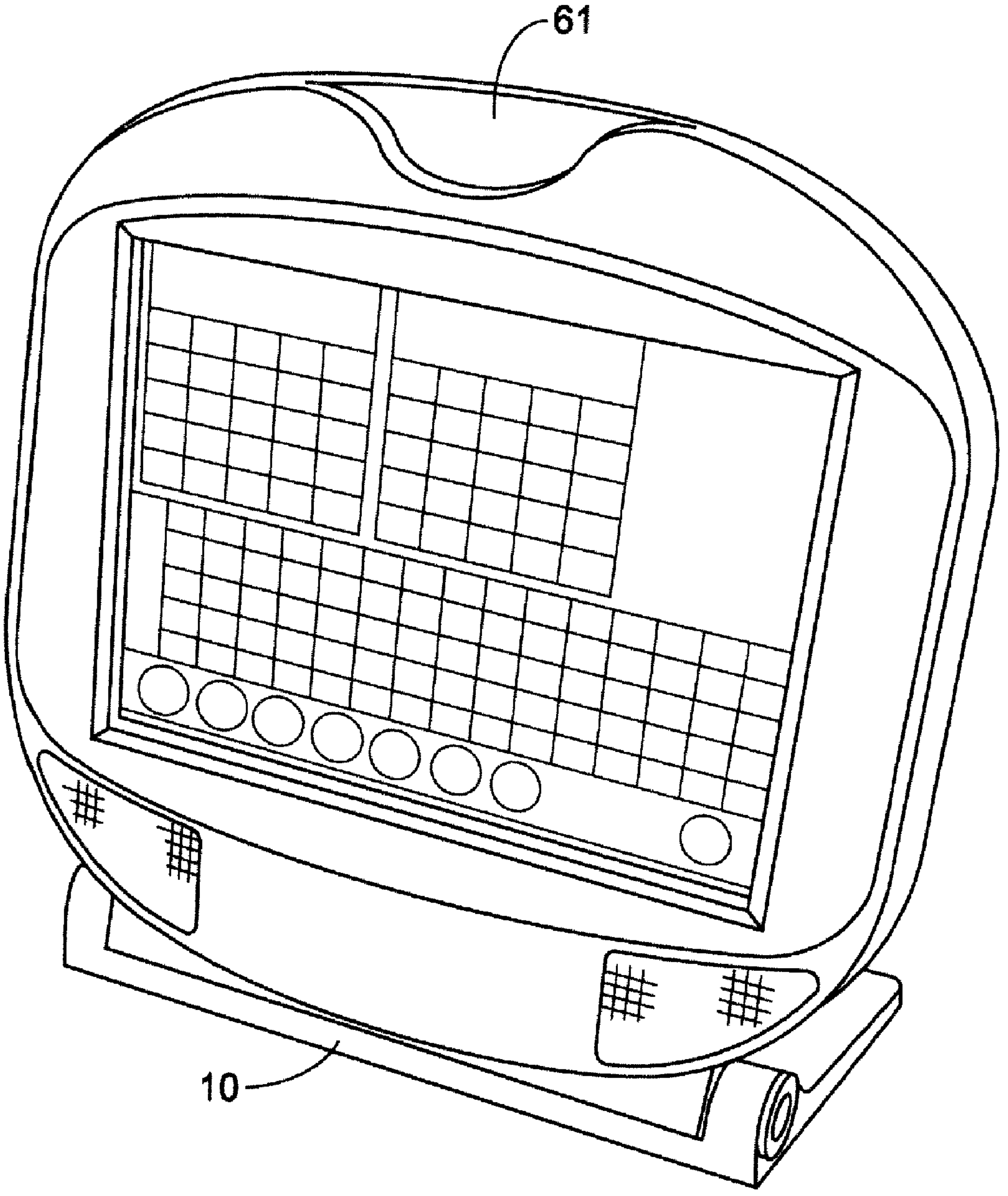
FIG. 4 is the front elevational view of an RGU according to a second embodiment, utilizing a base without a keyboard, shown in the game playing position.
Figure 5:
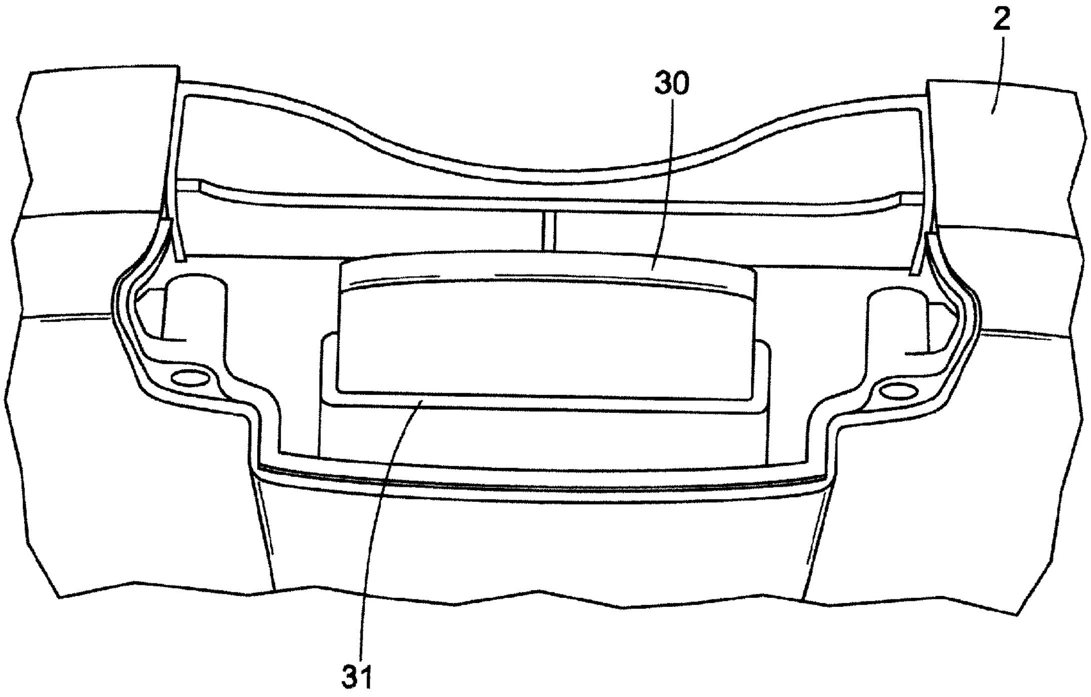
FIG. 5 is an enlarged top perspective view of the RGU of FIG. 1 with a dome light lens removed for service access to a radio card and a memory card.

Typical gaming devices in the marketplace have just enough memory to accomplish gaming functions in an effort to reduce cost and size of the products. Therefore, they do not have the infrastructure to handle large additional memory requirements. Those memory requirements are driven by the profitable sales of running memory intensive ads to individuals in a narrow target market, such as bingo players. The RGU contains a card slot that is gaming operator accessible without major disassembly of the RGU as shown in FIG. 5. The card slot is exposed by the simple removal of a dome light lens 61 (FIG. 4). The slot supports a plug-in, flash memory card 31 (108, FIG. 9) with a large amount of memory, typically on the order of 128 MB which is sufficient to run and display a high quality ad to the player. This plug-in, large capacity memory means, does not impact the cost of the basic RGU when ads are not needed, but does allow improved operations of displaying ads that were not feasible on other current gaming products. An RGU radio module 30 (109, FIG. 9) used to support network communications is also a standard plug-in card that is accessible by gaming operators for easy service. Some state regulations require there be no radio in the RGU. The plug-in means also optimizes cost to accommodate various markets with and without radio. A wireless communication means to load gaming data is provided by an Infra red optical device on the RGU when the radio is not present.

Feature: Intelligent Battery Pack and Power Loss Prevention

Similar portable, wireless, Bingo gaming products currently in the marketplace generally do not incorporate intelligent battery packs. When a player loads his purchased gaming data, there is no accurate means of determining if the unit has enough battery energy to complete the entire bingo session comprising of many games and typically lasting for 4 hours or more. In many cases, gaming units go into power failure before the session is completed and require operator assistance and a delay in the game while their gaming data is transferred into another gaming unit. The RGU 1 incorporates an intelligent battery pack with a unique serial number stored in its memory, that when queried by the RGU computer, discloses its remaining capacity and identification information. Therefore, the RGU can automatically adjust for battery packs of differently rated, full charge capacities. The supporting Console to the RGU is preprogrammed with the total session duration and that duration is loaded into the RGU with the player's purchased gaming data. The improved gaming unit then compares the session duration information to the battery capacity and will allow gaming only if the unit can complete the session. If the battery capacity is not adequate, the improved unit will display a message alerting the gaming operator and player that the purchased gaming data must be put onto another unit before gaming starts. This methodology reduces player frustration, eliminates power failures and resulting game delays, reduces the need for operator assistance during gaming, and provides a more secure gaming environment.

Feature: Dual Computing Elements, No ON/OFF Switch

Similar portable, wireless, Bingo gaming products currently in the marketplace generally employ an ON/OFF switch to power the unit off and use a single internal computer. Players have been known to accidentally or inquisitively power units off during gaming resulting in confusion and possible missed winning conditions. Once powered off, the unit has no capability to quickly respond to any external events.

The RGU 1 does not have an ON/OFF switch, but has two separate computer elements 100, 102, as shown in FIG. 9. The secondary computer element 102 is a very low power microcontroller that stays powered at all times until the battery pack is fully discharged. The primary computer element 100 is a faster more powerful gaming computer that stays powered only when necessary. The secondary computer has the ability to power the primary computer on and off or suspend and resume the primary computer. The suspending and resuming of the primary computer 100 does not destroy gaming information and the game continues exactly where it left off when the primary computer is resumed by the secondary computer. Since there is not an apparent ON/OFF switch available to the player, the improved gaming unit always stays powered. Unknown to the player is a hidden magnet (not shown) in the RGU keyboard 24 that activates the suspend process (and others) when the keyboard is pivoted to the flat charge/transport state (FIG. 3). If no gaming data has been loaded onto the RGU and the keyboard is placed in the charge/transport position, the secondary computer 102 will power the primary computer 100 off, resulting in a continuous low power state with the secondary computer always on. The secondary computer then has the ability to quickly sense insertion into a charger, and also power up the primary computer on a periodic basis to check for network commands. Network commands such as Start of Session and Start of Mass Download will then keep the fast gaming computer 100 active by executing the appropriate application program.

Feature: Self Wake, Inventory and Battery Management

Unlike other current products with ON/OFF switches, the low power secondary processor 102 of the RGU 1 has the ability to periodically wake up the primary processor 100 so that the primary processor can identify itself to the network and respond to any pending network commands. Upon wakeup, or if already awake during gaming, the RGU identifies itself with its serial number and battery pack information. The Console records that information and generates an RGU inventory report that can be printed or transmitted via phone line to corporate headquarters, thereby providing a remote site with automatic and current RGU inventory and battery data. Two snapshots of the battery data are taken, one at the start and one at the end of the session. Corporate headquarters can extract session run time, battery capacity, and battery voltage at the start and end of many sessions to establish a trend line chart to analyze deterioration of the battery pack over time. The RGU Lithium Ion, high capacity battery pack 118 is a relatively expensive item and a costly undertaking to field replace tens of thousands of aging battery packs. The trend line data will allow corporate headquarters to maximize the life cycle of the battery pack by serial number and anticipate cash flow and service needs for the replacement of them.

Feature: Shock Isolated Display and Computer

Both the touch panel 5 and display 6 are glass based products. Typical display and touch panel sizes found in bingo gaming units range from 5" to 10" displays. The 10" color display requires much more battery capacity to complete a bingo session than a 5" display. The weight of the gaming unit is thereby increased by weight of the battery and larger display glass and corresponding larger touch panel glass. The additional weight of the 10" product increases the shock imposed to the housing and internal components when the portable unit is accidentally dropped to the floor during normal handling. The large 10" glass and electronics are typically subjected to shocks that more often than not, with current products in the marketplace, result in a cracked touch panel. Repairing of the computer and touch panel requires complete disassembly of the product thus taking the unit out of service for a time period in which it loses revenue in addition to the cost of shipment and factory repair.

Figure 12:
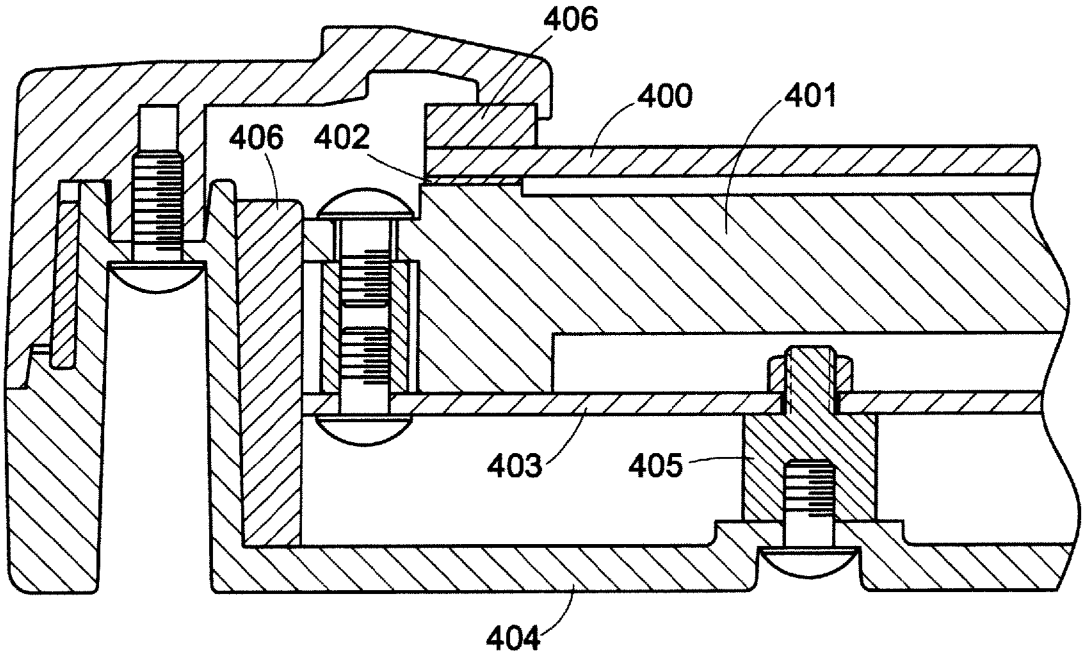
FIG. 12 is a greatly enlarged cross sectional view of an RGU housing, touch panel display and shock isolators that illustrates a method in which a computer circuit board and the display are shock mounted to the housing.

As shown in FIG. 12, the RGU 1, which currently uses a 10.4" display, employs a shock mount system for the computer, display, and touch panel. The shock mount system significantly reduces breakage and increases the operating profits of the product compared to similar 10" bingo gaming products in the current marketplace.

Feature: Alternate AC Line Power

Similar portable, wireless, Bingo gaming products currently in the marketplace generally do not support an alternate means of powering them from the AC power line. They are designed and manufactured as battery or AC powered units that are not convertible in the field. For the rare cases that support alternate battery or line power, gaming data and/or point of program execution is typically lost during momentary line power interruptions (momentary being defined as seconds to an hour). To avoid this, large, costly Uninterruptible Power Supplies (UPS) that can support 1,000 gaming units must be installed with modification of the facility AC power line wiring to the gaming unit tables. Alternately, costly Lithium Ion battery packs similar to that used in lap top computers are used to support the gaming unit during power failure. These are costly and undesirable methods and tasks for the gaming operators.

The RGU 1, when line powered, uses a very small and low cost AC to DC power adapter in conjunction with a small, low cost 9-volt rechargeable battery 130 that is easily replaced at end of life, special fast acting line power failure sensing circuitry (127, 128, 129), and a program resident in the secondary computer 102 that rapidly places the primary computer into suspend mode on the occurrence of line power failure, thereby preserving gaming data and program point of execution. During absence of line power, the secondary processor continues to run from the 9-volt battery source 130 until stable line power has been restored. The secondary computer software filters out common rapid ON/OFF line power fluctuations (on the order of less than 5 seconds in duration) to prevent false restart of gaming operations during these fluctuations. When line power is restored, the 9-volt battery automatically recharges in preparation for the next failure. To ensure long life of the 9-volt battery, when the secondary computer is running from the 9-volt battery during power failure, it monitors the discharge state of the battery. To prevent battery damage due to over discharge, the secondary computer self disconnects from the battery and powers itself down after approximately one hour. Therefore, the improved RGU product is easily and cost effectively converted from battery power to line power in the field, does not lose gaming data or point of program execution for up to one hour after a loss of AC power, automatically resumes gaming to the exact point in the game at the time of suspend, does not require installation of a costly central UPS with line power wiring modifications, and provides automatic recharging of the 9-volt battery, all of which are a means of significant improvements to gaming operators from current products in the marketplace.

RGU Interactive Network and System Operations

Figure 6:
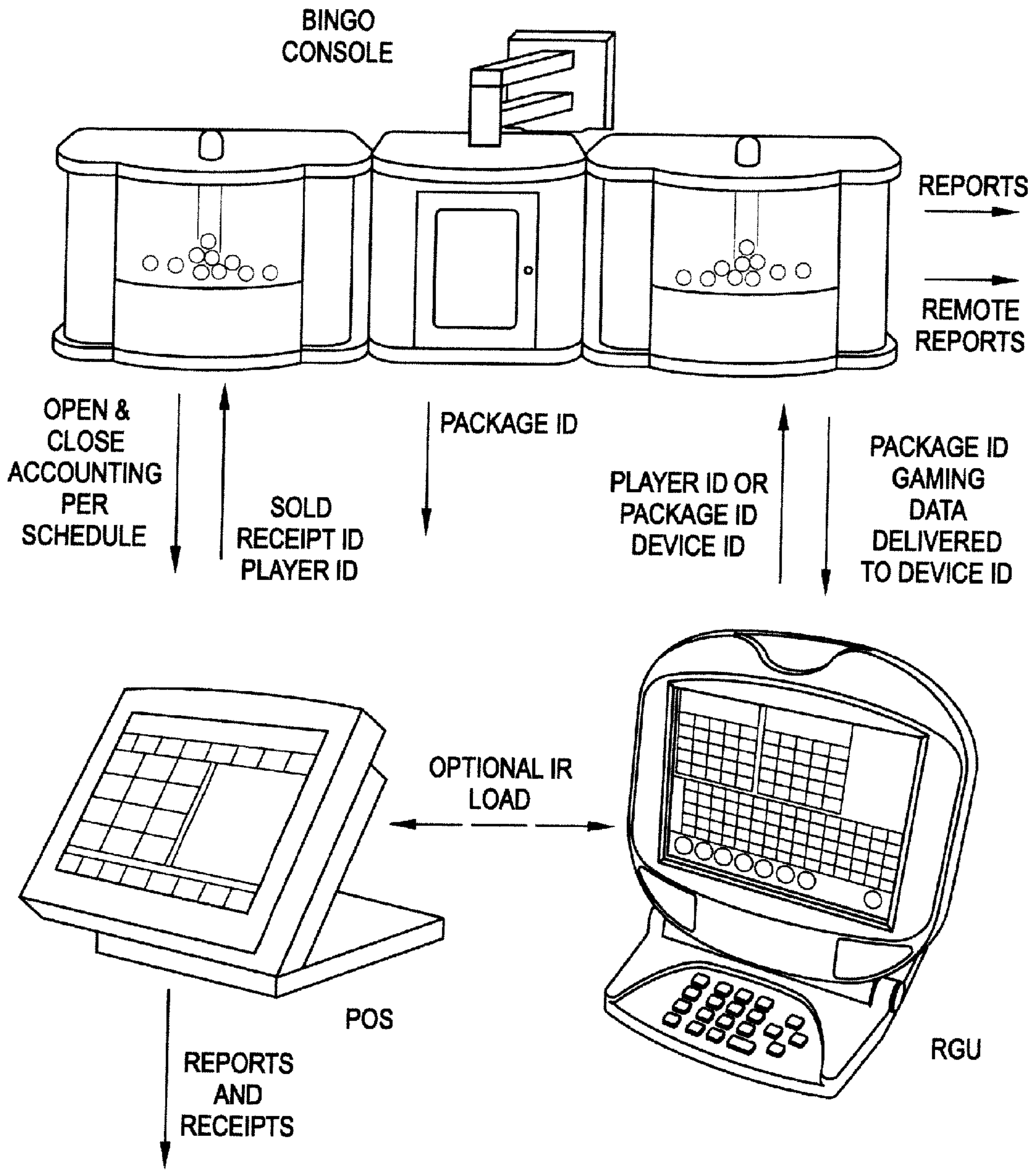
FIG. 6 is a perspective view of major network events and information flow that link three major elements, a Console, a POS, and the RGU, of the integrated gaming system disclosed herein.

Referring to FIG. 6, the Console opens a session and informs the RGU 1 and POS with a Start Session broadcast on the network. The POS then records all financial transactions until it receives a Close Session broadcast from the Console, then it prohibits further transactions and tags all recorded transactions and reports to that completed session. Likewise, upon receipt of the Close Session broadcast, the RGU will terminate gaming operations, delete all purchased gaming data, and revert back to a log in screen waiting for a new session to start and for the next player to log onto the RGU. For security and regulatory purposes, the RGU retains no previous gaming data or bingo card faces from the session that was just closed.

During an active session, the player purchases gaming offerings for the RGU and uses his player tracking card on the POS card reader and the POS informs the Console of the quantity and type of items purchased, the player ID, and receipt transaction ID. The Console then uses its resident data base of bingo card faces and builds a unique electronic package for that specific player and exactly equal to what the player had purchased. The Console returns a package ID number over the network to the POS to indicate a successful build and the POS now associates and stores the player ID, receipt transaction ID, the package ID, and then prints all transaction ID information on a player sales receipt. The player then takes the portable RGU out of a kiosk or charger cabinet and proceeds to his seat location within the bingo facility. The player swipes his player tracking card on the secure and internal RGU card reader 4 (FIG. 1). The RGU sends over the network the player ID and its own RGU internal, unique, permanently stored device ID to the Console. The Console takes the received player ID and locates the matching exact package that was built for that player. The Console then associates and stores the RGU device ID to the transaction ID and then sends the package over the network to the RGU. The RGU verifies its specific device ID against the device ID of the package sent, acknowledges receipt of it over the network to the Console, and then prepares the package for game play. The Console internally closes the transaction and informs the POS to internally close the transaction since the exact purchased item has been successfully delivered to the player. With one convenient, player error free card swipe, the player is now ready to play bingo and other games on an RGU that is secured to his player card. Alternately, if gaming operators decide not to use player cards, the package ID number from the player receipt can be manually keyed in to the RGU in lieu of the player ID. The same exact package will be located on the console that belongs to the package ID rather than the player ID.

One piece of information contained in the package sent to the RGU is session duration. While preparing the package for game play, the RGU queries its intelligent battery pack 118 and compares remaining capacity against the session duration value. If the battery does not have sufficient capacity to complete the session, the RGU will display a low battery message to the player, conveniently turns on the red LED 103 to get the attention of the gaming operator for the player, and does not complete the preparation of the package which prevents the package from playing on that RGU, The gaming operator then takes the player's card and/or receipt and goes to the POS and instructs the POS to allow the exact package belonging to that receipt ID and player ID to be reloaded into another RGU. The POS reopens the exact transaction and cancels the association of the current device ID to the transaction ID and also informs the Console of the event over the network. The Console then sends a network command to the current RGU device ID to delete the package it had received and the RGU returns to the log in screen and the gaming operator places the RGU into the charger. The player is then given a second RGU and the player swipes his card and the package download process repeats itself as noted in the above discussion ending in the closing of the transaction with the association of the second device ID to the original transaction ID number, thereby loading the exact original package into another RGU.

The RGU uses 802.11 radio technologies providing a secure network at the physical layer by the virtue of the 802.11 spread spectrum radio modulation of the data coupled with 128 bit WEP encryption, an E-max Gaming Corporation network identifier, and augmented at the transport layer by scrambling of data where necessary with use of additional system identification.

The RGU gaming package that was purchased and sent over the network contains at least a unique session ID for the current active session, session duration time value, specific purchased gaming data defining games, intermission, faces and patterns for the games, time of package download, display backlight and audio volume settings, last ball logic enabled/disabled, marquee and theme information, birthday and anniversary notification, manager passwords, player name and card number, a time value of when to automatically expire the package and max cards allowed to meet certain state regulations, routed or stationary operation, and one of three modes of play, Auto Mode, Semi-Auto Mode, or Manual Mode.

Auto Mode sends each called ball with current session ID over the network, momentarily displays the ball image for the player, then automatically daubs and ranks all cards being played for that game. Also, the RGU has a means to provide the player with notification that the RF link has failed and will automatically force the gaming to the Manual Mode such that play can continue. When in Auto Mode, the player can not manually enter balls to keep the auto game play accurate and free of false wins that are evident on other current products in the marketplace.

Semi-Auto Mode sends each called ball with current session ID over the network, continually displays the ball image for the player until the player touches the ball on the touch screen or hits the Enter key on the keyboard, then automatically daubs and ranks all cards being played for that game. The instant RGU has a means to provide the player with notification that the RF link has failed and will automatically force the gaming to the Manual Mode such that play can continue. When in Semi-Auto Mode, the player can not manually enter balls to keep the auto game play accurate and free of false wins that are evident on other current products in the marketplace.

Manual Mode requires that the player manually key on the keyboard or enter on the touch panel, each ball called, then the RGU automatically daubs and ranks all cards being played for that game. If the system was originally in Auto or Semi-Auto Mode, and the RF network becomes valid again, the RGU has a means to re-establish RF communications and revert back to the original mode of play.

Also note that the RGU contains no pre-loaded bingo faces or session gaming information prior to the package being physically sold at the POS and then the exact package being loaded into the RGU only during an activated session. Many gaming units in the marketplace preload many bingo card faces and then play only the portion of those faces that have been purchased. It has been demonstrated that this technique is open to corruption if more faces than purchased are erroneously enabled causing the gaming unit to win excessively.

Therefore, the security and accuracy of the instant system's transactions are greatly enhanced with a tightly integrated system comprised of secure network communications between all three elements of the system; Console, POS, and an improved RGU with means to conveniently and accurately complete the transaction with safeguards against power failure during gaming and false wins.

In summary, the following is a partial list of key interactive system network functions between the Console, POS, and RGU.

1. Available list of Organizations to select from for editing on the POS
2. Activate schedule for a specific bingo organization and session with a unique session ID
3. Win notification and advance to next game
4. Win notification and stay on the game for second chance bingo
5. Jump to any game in the session, forward or backwards
6. RGU package loading containing a plethora of information and operational instructions
7. Ball calls from the ball blower or random number generator
8. Manual un-call of specific ball numbers
9. Periodic RGU device ID reporting
10. Void a package on a specific RGU or dump package for reload
11. Delete specific face/pattern that has won
12. Caller's choice pattern deletion or insertion
13. Inventory sold in the specific session at the POS for validation of payout at the Console
14. Console game payout information to the POS for accurate POS payout and accounting
15. Verify all POS cash drawers are closed before deactivating the session
16. Deactivate session 17. Locate an RGU (during gaming, enter a device ID and the dome light on that unit turns on)
18. Turn on/off the dome light, steady on or blink, any one of the three colors red, green and yellow
19. Synchronize data between Console and POS
20. RGU sold/load/void/reload reports for revenue tracking of electronics
21. Time service that synchronizes real time clocks on all three products
22. Network activity monitor to automatically transition to Manual Mode game play from Auto Mode on RF link failure
23. Device Test function locates all active RGUs in the facility and gives a total count
24. Clear RGU logs
25. Reset all RF Access Points on the network
26. Player credit and purchase requests
27. RGU Mass Download functions Mass download is a non gaming function that allows gaming operators to update software simultaneously in all RGU's via the RF network with the aid of a utility program resident on the Console. The Mass download utility on the Console stores and displays the current revision levels of all software that was downloaded. Application, Operating System, and radio firmware software can be mass downloaded.

Each State in the United States that allows electronic bingo gaming units, and sometimes each County within a State, will typically have published rules concerning the legal operation of the gaming unit, Console, and POS. The rules have large differences, such that a single piece of bingo hardware and software must be configurable to meet the needs of any one State. Typically, the distributors licensed in a given State are responsible to manually set up and configure the hardware and software in the system for legal operation in that State. This can be time consuming and error prone.

This disclosed invention incorporates hardware and software that can be configured by the distributor simply loading a State Configuration CD (or other storage media) into the main computers of the POS and Console that allows the distributor to select the desired installation State from a list of all States and then the Console and POS configure themselves for proper State operations as defined by the information provided on the CD. This dramatically reduces errors and makes the installation much faster. At the point of creating a bingo session on the Console many items are inhibited from illegally being entered such as exceeding the maximum number of faces allowed by the State to be built into a package for download into an RGU. Likewise the POS has similar safeguards, one of which is that it will not allow multiple packages of legal sizes to be combined into an illegal sized package and sold at the POS. This State Configuration means, and a means for inhibiting critical functions whose limits or allowed presence were defined by data on the CD, result in much improved system integrity and security.

This invention's system integration in conjunction with a significantly improved RGU with unique combinational features as described in the Improved RGU Comparative Description section of this disclosure, gives this disclosed invention a significant advantage over current products and systems in the marketplace.

RGU Description

With reference again to FIGS. 1-3, and as indicated previously, the RGU 1 comprises an housing 2, which can be a sturdy polycarbonate plastic injection molded housing. The housing 2 comprises the display 6 and the touch panel 5, which when in use is positioned in a generally vertical plane. The display is a 10.4" display; although, this is not required. The base 3 includes the keyboard 24 and is attached to the housing. The base is pivotal relative to the housing to a first, in use position and a second, storage/transport position. The first position situates the base in a generally horizontal plane. In the second position, the base can be stored in a plane generally parallel to a plane defined by the housing 2.

The keyboard 24 includes the plurality of keys 11. In the depicted embodiment, twenty keys are provided; although, more or less than twenty keys are contemplated. The keys allow the player to conduct gaming from the keyboard. Four of the keys can act as cursor keys allowing navigation of an optical cursor over the display. The use of an Enter key on the keyboard 24 will cause execution of that function depicted on the display. The touch panel 5 and keyboard 24 can be seamlessly and randomly used during gaming by the player since the hardware and software internal to the RGU 1 self identifies the source of the player input and uses it accordingly.

The bright dome light assembly 7 is secured to the housing 2 and includes a diffused translucent plastic lens. The lens includes an inner surface which is illuminated by both the Red and Green light-emitting diodes (LEDs) housed in the assembly. As indicated previously, the illumination of the LEDs yield three distinct colors, to with, Red, Green, and Yellow (which is a combination of the Red and Green blended by the diffusion of the lens). Audio is available, in stereo, via the small built-in speakers 8 or via an external headset through a headphone jack (not visible).

With reference to FIG. 2, the magnetic card reader slot 4 is integrated into the housing 2, which requires the player to swipe his card in the vertical plane from top to bottom of the RGU. Although, it should be appreciated that the magnetic card slot 4 can be integrated into the base 3. The magnetic card slot is created by two pieces of plastic that are assembled to the housing 2. These two pieces of plastic can be interchanged with two different pieces of plastic that can support a Smart Card reader as a product option.

As shown in FIG. 2, the base 3 is the first, normal playing position. When the keyboard 24 is not in use, the pivot 20 allows the base to rotate to a plane in parallel to a plane defined by the housing 2. The support handle 21 creates a sturdy support for the back of the housing and display by interlocking into the base 3 during normal play of the unit. The support handle creates the fixed, optimized viewing angle of the display and keeps the display mechanically stable during the forces exerted on the touch panel by the player. When not in play, the support handle also rotates in a plane parallel to the plane defined by the housing 2 as shown in FIG. 3, which illustrates both the support handle 21 and base 3 in a plane parallel to the housing. This is referred to as the transport position. In this position, the support handle now becomes a convenient means for the player to carry the gaming unit.

As shown in FIG. 4, a support base 10, with no frontal keyboard area, can be assembled to the RGU. The support base also pivots relative to the housing in an identical manner to the base 3. This option is to accommodate bingo faculties with a very small desk top playing area and that need only touch panel operations. Keyboard base 3 or non-keyboard support base 10, both self identify to the RGU such that RGU software knows if a keyboard is attached or not and the program automatically adapts to the hardware configuration of the product.

With reference to FIG. 7, a model of a player and a conventional gaming unit on a table top is illustrated. Many products in the marketplace have the gaming unit display viewing angle at forty-five degrees (45°) from vertical. This creates a condition in which the player sees the reflection of the overhead lighting of the bingo facilities in the display of the gaming unit. As shown in FIG. 8, a comparative model to FIG. 7, a viewing angle of the RGU 1 is on the order of twelve degrees (12°) instead of forty-five degrees (45°) which results in a major reduction in the player seeing overhead lighting in the display of the gaming unit. The height of the RGU 1 is limited to approximately twelve inches (12") which is lower than the shoulder height of the average player from the table top, thereby blocking light from directly behind the player from hitting the display. The twelve degrees (12°) viewing angle is also a more convenient angle for player touch screen operations. Since there is space between the touch panel surface and the display surface, the twelve degrees (12°) viewing angle also reduces the parallax between the touch surface and the display surface image compared to an angle of forty-five degrees (45°) commonly used in the marketplace.

With reference to FIG. 5, the dome light translucent lens of the light assembly 7 is removed from the housing 2. This exposes the plug-in radio card 30 used for primary RF network communication in the bingo system, and the optional plug-in memory card 31 that is utilized for large memory expansion needed for advertisements and surveys that may be required at certain bingo facilities. The plug-in card slots provide a convenient means for gaming operators to quickly replace a defective radio card and not take the RGU out of service for costly factory repairs and quickly add advertising capabilities to their gaming unit without affecting the base cost of the gaming unit.

A block diagram of the RGU's internal electronics is illustrated in FIG. 9. A primary processor or computer 100 is of the embedded type that puts computing speed in the modest range of 400 MHz and therefore consumes less power than a typical lap top computer. The primary computer is the main application processor that handles gaming logic, network communications via the Radio card 109 and PCMCIA slot 111 or optional Ethernet port 126, can access large amounts of memory on the order of 128 MB on memory card 108 and PCMCIA slot 110, controls and generates audio functions via Audio CODEC 122, Mic 125, speaker 124, and headset 123, and sources video images to the display 112 via the display controller 113 containing internal video memory, adjusts the brightness of the display backlight 115 via the control of the display backlight inverter 114, and interprets data from the touch screen 116 via the touch screen controller 117. The primary computer is supported by traditional Flash memory and DRAM memory 101 for program and variable data. The primary computer also controls wireless Infra Red (IRDA) 121 communications to the POS station to download gaming data into the RGU when the RF communications path is not used. The primary computer can also communicate with an optional Biometric device, such as thumb print recognition, for player security access to the RGU.

A secondary processor or computer 102 is of a small microprocessor controller type that is very low power compared to the primary computer. The secondary computer handles certain hardware input/output devices such as magnetic card reader 106, optional Smart Card reader 105, keyboard 104, dome light LEDs 103, reads data from battery pack 118, and controls interface 119 to an intelligent battery charging system. When gaming and network communications unduly burdens the primary computer's bandwidth, which may affect the ability of the primary computer 100 to react to a multitude of fast occurring player Input/Output events, the dedicated secondary computer 102 relieves the primary computer of these I/O tasks. Another important task of the secondary computer is to interface to the Regulators 128, backup power 127 (a high capacity capacitor commonly referred to as a supercap), and power monitors 129 to provide a cold reset of the primary computer 100 by shutting down the primary computer regulators (a portion of 128) under certain power fail or charging conditions. Yet another important task of the secondary computer 102 is to control the suspend and resume process of the primary computer 100 to provide a low power means to periodically wake up the primary computer at a specified programmable time value given by the primary computer to the secondary computer before the secondary computer suspends operation of the primary computer. The interface between the primary computer and secondary computer consists primarily of a serial communication channel and hardware suspend/resume line.

The battery pack 118 receives Charging Power 120 from an external charger via metal contacts embedded into the RGU housing 2. The secondary computer 102 and the external charge circuitry combine to provide an intelligent and safe charging system for a Lithium Ion battery pack. The secondary computer 102 reads data from the intelligent battery pack to measure its current, voltage, temperature and remaining charge capacity. The secondary computer prevents damage and unsafe charging conditions to the battery pack by inhibiting charge under temperature extremes and abnormal battery voltages, and has charge cut off timers to prevent overcharge or continuous charging of the battery pack.

Figure 10:
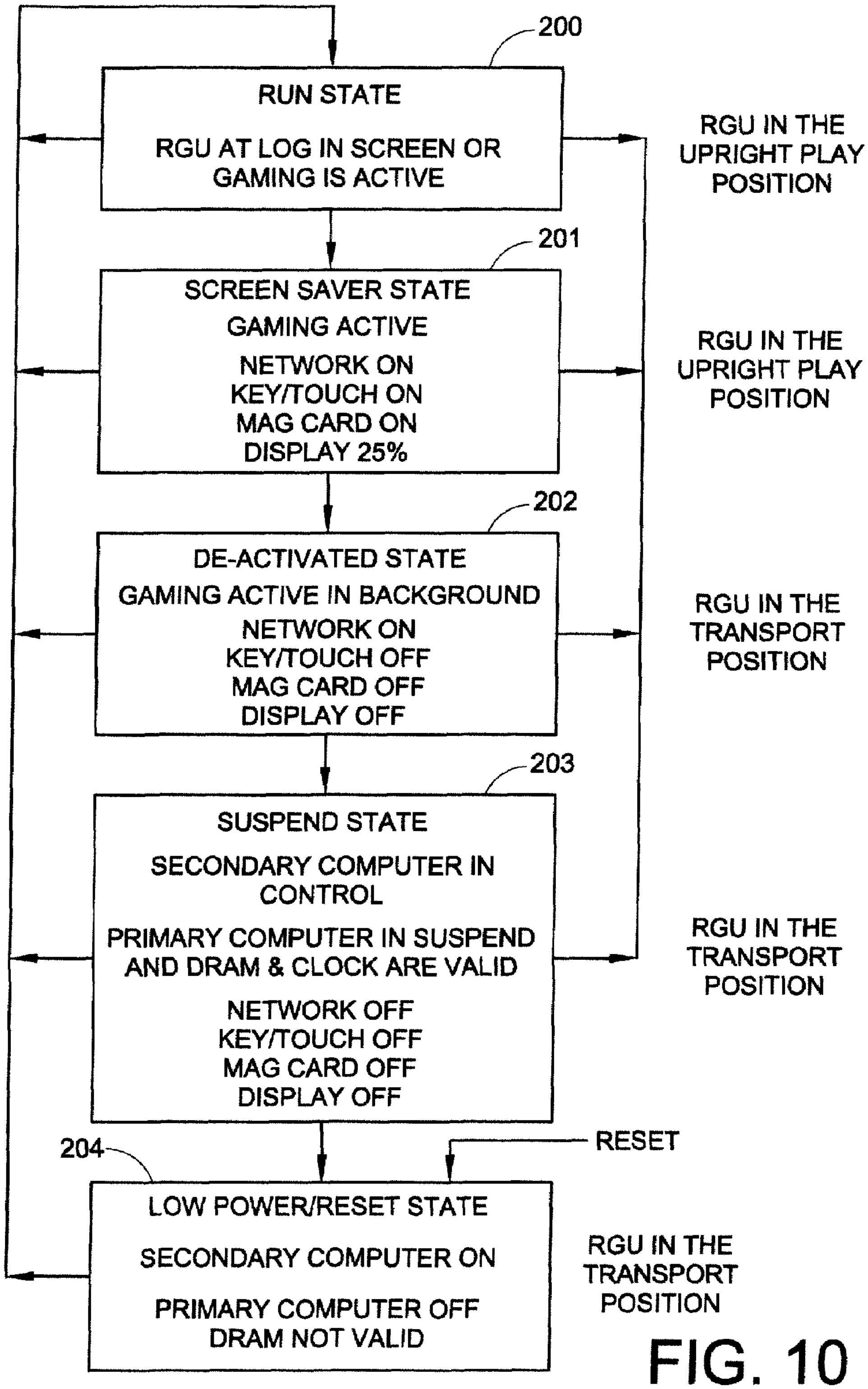
FIG. 10 is a high level diagram of the program and operational states of the RGU when it is battery powered.
Figure 11:
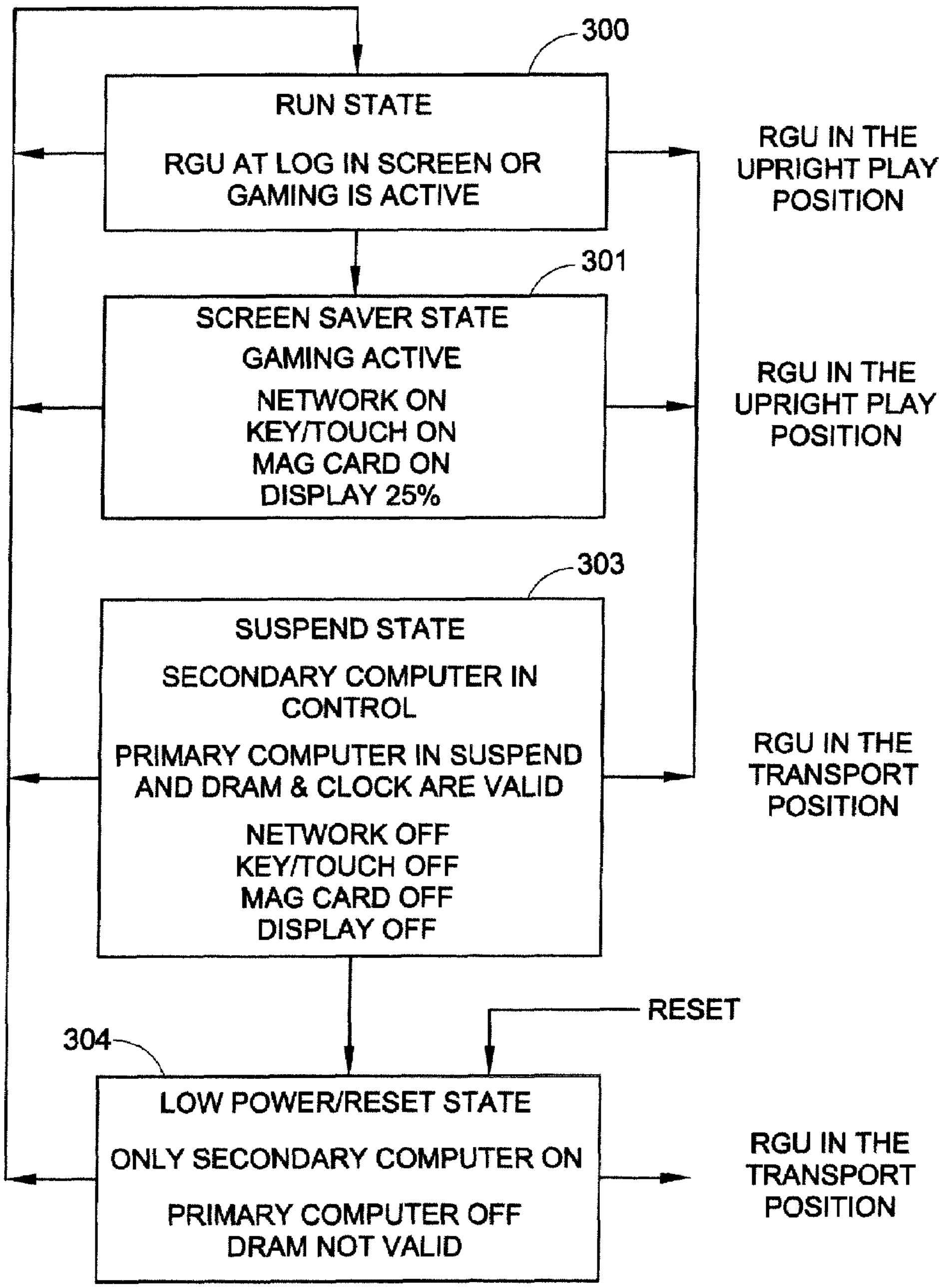
FIG. 11 is a high level diagram of the program and operational states of the RGU when it is AC line powered.

The RGU circuitry can auto detect, on a cold reset, the source of power (e.g., battery or AC line), and if different than the previous cold boot, stores the power source status in a silicon custom chip. The circuitry automatically executes program logic in accordance with two different state diagrams as shown in FIG. 10 and FIG. 11 respective to battery or AC line power.

Because of this means, in lieu of using costly battery packs 118, an optional low cost external AC adapter coupled with an internal low cost 9-volt battery 130 can be used to power the RGU 1 from the AC line. This reduces cost for gaming operators not wishing to use the Lithium Ion pack and have to support them with many charging racks, and the logistics of collecting the gaming units and placing them in the racks, often multiple times a day. If a sudden loss of AC power is experienced, the RGU circuitry quickly detects it and the 9-volt battery will power the RGU 1 while the secondary computer 102 suspends the primary computer 100 thereby saving all gaming data and the exact point of program execution. The 9-volt battery then continues to power the secondary computer and the suspended primary computer until AC power has been restored, or approximately one hour has elapsed, at which time the secondary computer 102 senses that the 9-volt battery is ready to experience power failure. The secondary computer then disconnects power from the 9-volt battery and the entire RGU is now powered completely off.

For a battery powered RGU, the RGU's primary computer 100, the secondary computer 102, Console network commands, charger detection logic, and a magnet in the keyboard base 3 or non-keyboard support base 10 combine to create various program states of the RGU1 for gaming and non gaming conditions. Referring to FIG. 10, a high level diagram of a battery powered RGU is illustrated. The Run state 200 is the state for full gaming operations, player interaction, network communications, and the RGU is in the upright play position. The play position is determined by the proximity of the magnet in the keyboard to an electrical magnetic field sensor on the computer circuit board. The secondary computer 102 monitors the magnetic field sensor output and informs the primary computer if the RGU is in the upright play position or the transport position (magnet activates the sensor). The RGU 1 consumes maximum power in the Run state.

In the Run state, the RGU presents a player Log-in screen. When the player swipes his or her player card or keys in the package ID from the sales receipt, the RGU will go to the network and download the gaming data into memory. Gaming screens and player controls are then presented to the player. If an error occurred during the download process, the player is alerted with messages and at least one of the LED will be illuminated, preferably the Red LED, calling for gaming operator assistance. Also, one of the player's controls is an Assistance button. Pushing this button before or during gaming, illuminated the Red LED to call for gaming operator assistance. Yet another one of the player controls is a Lock button. If the player selects Lock during gaming, the Log-in screen reappears, but gaming continues in the background. If the RGU 1 wins while in a Lock screen, it alerts the player with an audible win tone and the other of the LEDs, preferably the Green LED, is illuminated. The player must swipe his card or key in the package ID to return to the gaming screens. The Lock screen also prevents other players from tampering, altering, or playing the RGU 1 in the temporary absence of the player.

Also from the Lock screen, a manager can interrogate the status of the gaming unit. The manager must swipe his magnetic card and then key in a password unique to that particular session that was downloaded with the gaming package. A Manager screen appears allowing the manager to view information concerning balls called via the network or manually keyed, gaming actions taken by the network or player such as jumping to another game, a complete listing of the downloaded package content, power status, network information, current software revision levels, an error log, time to automatic package expiration set by the session, and the ability to manually delete the package from the RGU if the gaming unit is to be taken out of service. Note that if the sales transaction is voided at the POS, the POS/Console combination can automatically delete the downloaded package on the RGU 1 via the RF network at any point during gaming without being on the Manager screen. While on the Manager screen, the manager can not partake in any player gaming actions. The manager hits the Exit button to return to the Lock screen where the player must log-in to continue gaming. This improved security means, hides sensitive RGU and system information from the player during gaming, and yet allows interrogation of the RGU's data and performance for the game operators and regulatory inspectors without altering player gaming.

There are generally four primary causes to exit from the Run state 200. The first is the keyboard base 3 or support base 10 pivots or transitions to the transport position to exit to the Deactivated state 202. The second is the secondary computer 102 involuntarily suspends the primary computer 100 (power fail or other critical conditions) and exits to the Suspend state 203. The third is player inactivity by not touching the keyboard 24 or touch panel 5 for a predetermined time period and exits to the Screen Saver state 201. Finally, the fourth is a network command can force an exit to another state.

With continued reference to FIG. 10, the Screen Saver state 201 is entered due to player inactivity. This state reduces the back light brightness to around 25% of its original brightness, thereby saving battery energy. The display is still easily read by the player and the display will return to normal brightness when the player interacts with the RGU 1, a network command is received, or a card is swiped.

There are generally five primary causes to exit from the Screen Saver state 201. The first is player interacts with the RGU 1 and exits to the Run state 200. The second is a card is swiped and exits to the Run state 200. The third is the keyboard base 3 or support base 10 pivots or transitions to the transport position to exit to the Deactivated state 202. The fourth is the secondary computer 102 involuntarily suspends the primary computer 100 (power fail or other critical conditions) and exits to the Suspend state 203. The fifth is a network command can force an exit to another state.

The De-activated state 202 is primarily entered due to the base 3 or support base 10 being placed in the transport position. This state further reduces power by turning the display backlight off and disabling the touch panel 5, keyboard 24, and card reader, but the RGU 1 remains responsive to network commands and ball calls and can still conduct gaming functions and alert a player of a win. If the RGU is in the transport position, the secondary computer 102 can detect charger insertion.

There are generally six primary causes to exit from the De-activated state 202. The first is the keyboard base 3 or support base 10 is placed in the upright play position to exit to the Run state 200. The second is the secondary computer 102 involuntarily suspends the primary computer 100 (power fail or other critical conditions) and exits to the Suspend state 203. The third is the RGU 1 is inserted into a charger, in which case, the downloaded package will be automatically deleted, and exits to the Suspend state 203. The fourth is if the downloaded package specified that the RGU was in a routed environment being taken from facility to facility verses being in a fixed environment in one facility, the package will be deleted and exits to the Suspend state 203. The fifth is if no package has been loaded on the RGU, the RGU will stay in the De-activated state for a time period, then automatically exit to the Suspend state 203. The sixth is a network command can force an exit to another state.

As shown in FIG. 10, the Suspend state 203 is primarily entered from the De-activated state, a network command, or power fail conditions. This state further reduces power by placing the primary computer 100 in a low power suspend state in which DRAM data and some standby clocks are still active, stopping communication over the network, turning the display 6 and display backlight off, and disabling the touch panel 5, keyboard 24, and card reader. The RGU 1 is not conducting gaming operations, but can be resumed to the exact point in the program prior to entering the Suspend state. When resumed, the primary processor 100 receives a gaming status update from the network and updates itself to the current point in the game.

In the Suspend state, the secondary computer 102 continuously checks if the RGU has been placed into the charger, and upon a positive detection, it evokes a charger program. The secondary computer then monitors and controls the proper charging of the battery pack. When charge is completed, the secondary computer 102 cold boots the primary computer 100 by turning on the regulators, which then releases the reset line to the primary computer allowing it to start. The primary computer then identifies itself to the network and checks for any commands from the network. If there are no pending commands, the secondary computer will suspend the primary computer and then periodically resume the primary computer to check the network again. The periodic resume/suspend process repeats itself indefinitely until a network command is received or until the RGU is removed from the charger. The use of the low power secondary computer 102 for (a.) establishing and checking for acceptable battery power conditions, and (b.) controlling a higher power primary computer to wake and periodically identify itself and check for network commands consumes very little power. The time that the primary computer 100 is operational is very short, on the order of ten percent (10%) or less of the periodic wakeup time, and the battery is always replenished by the charger, yet allows the RGU to maintain communications with the network. Also, the secondary computer 102 a basis for the Console to maintain a real time inventory of each RGU while in the charger.

There are generally three primary causes to exit from the Suspend state 203. The first is if the RGU 1 is not in the charger and the base 3 or support base 10 is placed in the upright play position, exits to the Run state 200. The second is if in the charger, the secondary computer 102 periodically wakes the primary computer 100 and temporally exits to the De-activated state 202 and then returns to the Suspend state 203. The third is the RGU has experienced a total power failure (battery pack disconnect) and the battery voltage returns to normal, which causes the secondary computer 102 to reset the primary computer 100 and exit to the Run state 200.

The Low Power/Reset state 204 is entered from the Suspend state 203 if the battery voltage falls below a minimal acceptable value needed to maintain data integrity and resume back in the Run state 200 from the Suspend state, or the RGU 1 has experienced a total power failure (battery pack disconnect) in any state, or the hardware reset switch is manually depressed. At various points in the various states of the RGU, the secondary computer 102 expects a proper response from the primary computer 100 whenever the two computers interact on major functions. If the secondary computer does not get the proper response from the primary computer, then it enters the Low Power/Reset state.

Once in the Low Power/Reset state 204, a continuing declining battery voltage will cause the intelligent battery pack to electrically disconnect itself from the RGU at approximately five (5) volts, thereby protecting itself from deep discharge damage. When the battery voltage does return back to a nominal value by placing the RGU in the charger, the pack will automatically reconnect itself to the RGU. Primary cause to exit from the Low Power/Reset state 204 to the Run state 200 is the releasing of hardware which was reset to the secondary computer and the battery voltage is at an acceptable level.

If the RGU 1 is AC line powered, the RGU follows a different state diagram then when battery powered. Referring to FIG. 11, a high level diagram of a AC line powered RGU, the Run state 300 and Screen Saver state 301 are functionally equivalent to the battery Run state 200 and Screen Saver state 201. Since the RGU is line powered, the position of the keyboard and base are no longer meaningful to operations since the units are not transported or placed in the charger. Therefore, the equivalent of the battery De-activated state 202 is not present. The AC line powered Suspend state 303 and the Low Power/Reset state 304 are functionally equivalent to the battery Suspend state 203 and Low Power/Reset state 204, with minor exceptions of critical voltage set points and delays being different for AC than a battery. When the Low Power/Reset state 304 is exited, the program delays an additional 5 seconds before entering the Run state 300 to de-bounce any rapid fluctuations that are common to loss of AC line power or restoration of AC line power.

With reference now to FIG. 12, the RGU 1 incorporates a rubber shock mounting methodology to significantly reduce touch panel 5 and display 6 breakage and computer board failures due to shock imparted by unintentional drops from carrying positions or from table tops to various floor surfaces. Touch panel glass 400 of the display is mounted to a display module 401 with an adhesive, such as thin self adhesive tape 402. The display module is then mounted to a computer board 403 with rigid spacers and screws. This core subassembly is then mounted to a housing back 404 with rubber shock isolators 405 and screws that allow some relative motion in all directions between the housing and the core subassembly. To restrict the magnitude of the core subassembly motion within the housing, additional rubber shock absorbers 406 are assembled between the display module and the housing to properly center the display module within the housing and to prevent the touch panel glass 400 from coming in contact with the housing on a significant drop, which generally results in cracking of the touch panel glass. The result is the core assembly and the housing flex together with some relative motion between them, the magnitude of the imparted shock causing the motion is significantly dampened by the energy absorption of the rubber bumpers and simultaneous flexing of the entire product.

During gaming, battery or line powered, the RGU 1 periodically reports to the Console via the RF network its device ID which is a permanent, protected number embedded in flash at the time of manufacturing. Since the RGU automatically reads its hardware configuration for radio, memory card, power source, magnetic card reader, and keyboard, it also reports the current status of its hardware configuration of all of those items, including battery pack and radio card serial numbers. In addition, it also reports current software revision levels for the main computer operating system, the main computer application, and the secondary computer application. This means of reporting is yet another improvement of the RGU 1 that results in more accurate records for service and regulatory agencies, and helps define repeat problem units so they can be pulled out of active gaming to provide the highest level of gaming integrity.

Figure 13:
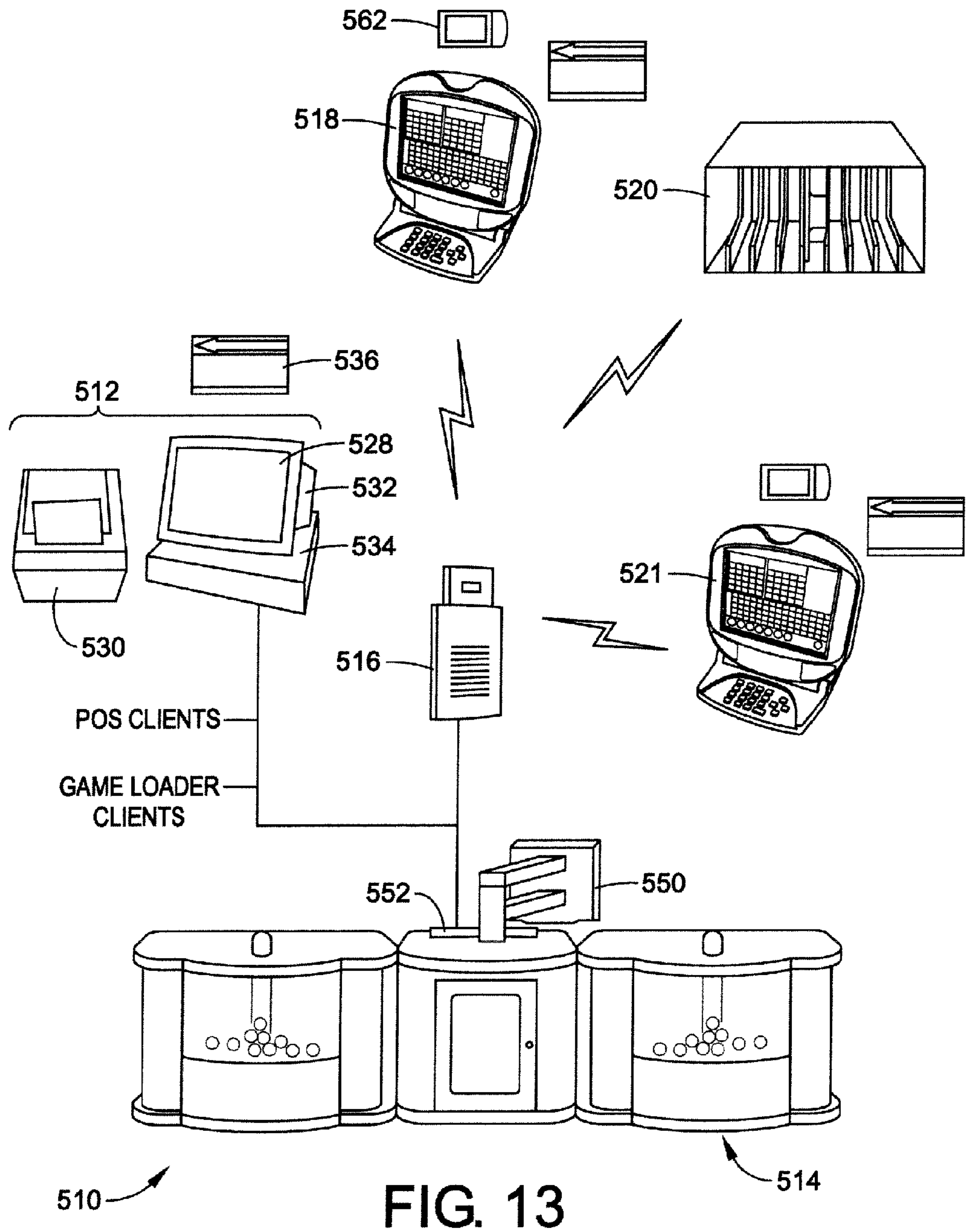
FIG. 13 is a schematic view of a gaming system according to a further embodiment of the present invention.

With reference to FIG. 13, a game system 510 according to one aspect of the present invention generally includes point-of-sale (POS) components 512, a gaming machine having master game controller 514, a wireless access point 516, a plurality of portable gaming units 518 (which are similar to the RGU1 described above), and a charging/dispensing rack or kiosk 520. The gaming machines can be battery powered as shown at 518, or AC line powered.

Figure 14:
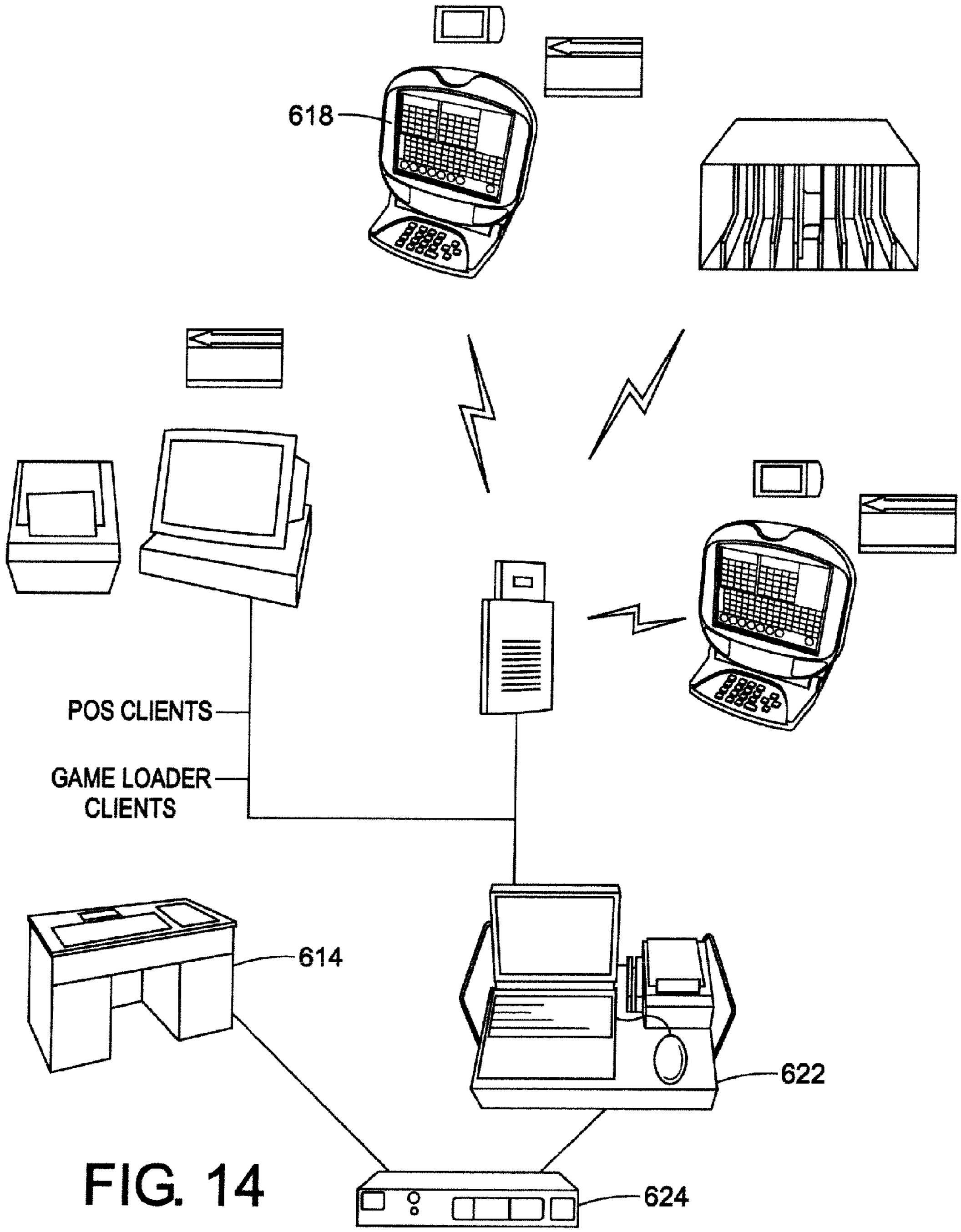
FIG. 14 is a schematic view of a gaming system according to a still further embodiment of the present invention.

As shown in FIG. 13, the master game controller 514 can be housed in the gaming machine of the general type shown and described, for example, in commonly assigned U.S. patent application Ser. No. 10/409,718 filed Apr. 9, 2003 for "Modular Bingo Console System with Multi-Port Communications and Manual Play Mode." The disclosures of this patent application are incorporated herein by reference. Alternatively, and as shown in FIG. 14, a master game controller 622 can separately connected to a conventional gaming machine 614, via a data router 624. In both gaming systems, the master game controller stores gaming data and communicates the data with the plurality of gaming units 518, 618, via a secure communication network.

With reference again to FIG. 13, the POS components typically include a video monitor 528, which can be a touch-screen video monitor, and a receipt printer 530. A housing of the video monitor can include a card reader 532 for reading credit cards or specifically created player cards 536. The monitor 528 can be connected to a PC-like computer 534. Generally, a player rents the gaming unit 518 from a worker at the bingo hall. Such gaming units can be stored in the kiosk 520 for recharging of their batteries. In order to rent the gaming unit, the player provides the worker with cash, check or a credit card, and receives, in turn, a player card 536. Along with a player's name, the player card 536 generally includes a magnetic strip or a barcode which when read by the card reader 532 typically includes player information such as the player's address, types of bingo cards generally played, winnings and the like. The player's information could appear on the video monitor 528. The player purchases a prepackaged set of electronic bingo cards or faces and receives a receipt from the receipt printer 530 evidencing same. Normally, manufacturers of paper and electronic bingo packs design their packs in such a way that each bingo pack contains predetermined numbered bingo faces per sheet and each bingo pack is identifiable by its manufacturer's pack identification number. To determine each and every bingo card to be played by a player in each and every bingo game of a bingo session for which a pack is intended, it is sufficient to know the pack identification number. Ideally, duplicate bingo cards are not allowed in any game.

When a player buys a prepackaged set of electronic bingo cards, the PC-compatible computer 534, which can include an external or internal server, downloads the prepackaged set of electronic bingo cards into an available gaming unit 518. For example, the downloading can initially take pace while the unit 518 is in the kiosk 520. The bingo hall operator can then take the downloaded unit out of the kiosk 520 and give it to a player who can take it to any location in the bingo hall. Each gaming unit 518 receives data, such as bingo patterns and bingo numbers from the master game controller 514 via the secure communication network. This can be an RF network, allowing portability to the gaming units 518. The data can also include additional prepackaged sets of electronic bingo cards, card themes, icons for daubers, advertisements, bingo hall information, player information (e.g. a player's birthday) and side games such as trivia games which can be separately purchased by the players.

The master game controller sends data to each gaming unit via the secure communication channel and the wireless access point 516. The data is generally stored in an internal memory of the gaming unit 518 (not visible) and then displayed on a display screen. The gaming unit can then play the downloaded prepackaged set of electronic bingo cards automatically. The master game controller can automatically verify all bingo cards downloaded into all of the rented gaming units 518, detect winning bingo cards, compute the prizes due to the winning players, and store the outcomes of the games in an internal database. In other words, the master game controller can include, in addition to a CRT screen 550, its own PC-compatible computer 552.

In order to prevent interception of communication between the master game controller and the plurality of gaming units 518, such communications can be encrypted with the help of a private encryption key that is initially generated by the PC-compatible computer 552 and downloaded into each gaming unit 518. As one example, the PC-compatible computer 552 can download each gaming unit 518 with at least one random digital security key to secure the two-way communications between the master game controller and the plurality of gaming units 518. Such a digital security key is typically known in the industry under a variety of names (e.g., a digital encryption key, DES key, an authentication key, a private key, a digital signature key, a hashing algorithm, etc.). Importantly, each gaming unit 518 can be downloaded with a new unique random encryption key each time the gaming unit is rented and, therefore, even if the same player accidentally rents the same gaming unit having the same identification number, the downloaded encryption key is different every time.

A random encryption key is generated by the PC-compatible computer 552 with the help of random number generation software utility in a conventional way. The details of the generation and utilization of an encryption key are omitted herein since techniques of data encryption are well known in the industry. Being downloaded with a security key, the master game controller can send authenticated data blocks to the gaming units 518 over a public radio frequency channel.

The secure communication network shown in FIG. 13, which includes the POS server, master game controller and wireless access point 516, is only one example of many possible embodiments of the present invention. The communication network may be a part of a larger system network. The larger system network may provide the capability for a large number of gaming units 518 throughout a bingo hall to be on the same secure communication network. High-gain antennas and repeaters may be used to expand the range of the wireless gaming unit allowing a player to play in all areas of a large bingo hall.

As previously stated, the secure communication network generally includes the wireless access point 516 which allows for wireless communication between each gaming unit 518 and the master game controller. However, it should be appreciated that the access point 516 may also be a wired access point that allows gaming units to be plugged directly into the secure communication network. For example, the gaming units may include an Ethernet connector that may be directly plugged into the access point. It should also be appreciated that more than one access point 516 may be used in the secure communication network depending upon the network topography. For instance, due the size of a particular bingo hall and the area covered by a single access point, there could be other access points used as repeaters located throughout the bingo hall. In addition, the wireless access point 516 could also be connected to an existing network.

As mentioned, the plurality of gaming units 518 can be generally hand-held devices which can operate in at least three modes, a run mode and a sleep mode both shown in FIG. 1, and a transport mode, shown in FIG. 3.

Audio is available, in stereo, (via the small built-in speakers 8 shown in FIG. 1) or via an external headset through a headphone jack (not visible). Lighting schemes, such as arrays of LEDs, may be added to the gaming unit to provide visual effects and to communicate status information to a player and the bingo hall operator (i.e. the player requests help or the player is a winner). Status information, such as a battery level and connection status, may be provided (for example, by the status light 7 shown in FIG. 1). The layout and number of the input buttons on the keyboard can vary.

The rechargeable battery could be any suitable type, such as nickel-cadmium, nickel metal hydride, or lithium ion. The type of battery technology used depends on the running conditions and recharging requirements for the game system 10. For example, the rechargeable battery can last five hours between charging. Charging of gaming units 518 may be accomplished by setting the gaming units in the kiosk 520.

For security, the wireless gaming units 518 can include an encrypted serial number (code), which is used to verify and authenticate each of the gaming units 518. For additional security, an electronic key/card may be used with the device. With an electronic key/card system, the gaming units 518 can not be activated until the key/card is inserted into a key card reader on the gaming unit. In addition, the gaming units 518 could include a small GPS (Global Positioning System) device to verify location of the device. Position verification may be used to insure the gaming units 518 are used only in legal gaming areas of the bingo hall and to track lost or stolen devices. When the master game controller detects that the gaming unit 518 is in a restricted area, it may discontinue communications with the gaming units. Further, the gaming units 518 may have an RF capacitive device (RFID) built into each unit. RF capacitive devices are often used in retail stores to prevent theft. When the gaming unit 518 is passed through a protected doorway, an alarm may be sounded even when the power is off to the gaming units. Other security features may be used on the gaming units 518 and are not limited to the electronic keys/cards, GPS sensors or RFID devices described above.

With continued reference to FIG. 13, the kiosk 520 is configured to receive the plurality of hand-held gaming units 518. Generally the kiosk stores the gaming units. When a gaming unit in the transport mode (FIG. 3) is placed into the kiosk, it switches to the sleep mode. This occurs as power is fed to the rechargeable battery in the gaming unit 518. The kiosk includes a battery recharge circuitry and may include communication means from the master game controller to transfer data to and from the plurality of hand-held gaming units 518. The charging kiosk 520 can recharge the batteries located in the gaming units 518 and provides an easy way to store and to transport the gaming units from one place to another. Each kiosk 520 includes a plurality of slots which may hold and store a respective gaming unit. In particular, each gaming unit 518 includes a recharge contact (not visible) on a back side of the housing for access when the gaming unit is positioned in one of the plurality of slots in the kiosk. The recharge contact engages a mating contact located in the kiosk. Battery recharge circuitry converts alternating current to direct current and charges the gaming unit battery via the mating contacts.

Upon completing play, the gaming unit 518 is brought to the redemption cashier station. There it is interfaced with the PC-compatible computer 534 directly, whereby data is transferred to the PC-compatible computer which generates a display and/or printout of any prize winnings. All the gaming units 518 can be collected at the end of play and inserted into the kiosk 520.

Figure 15:
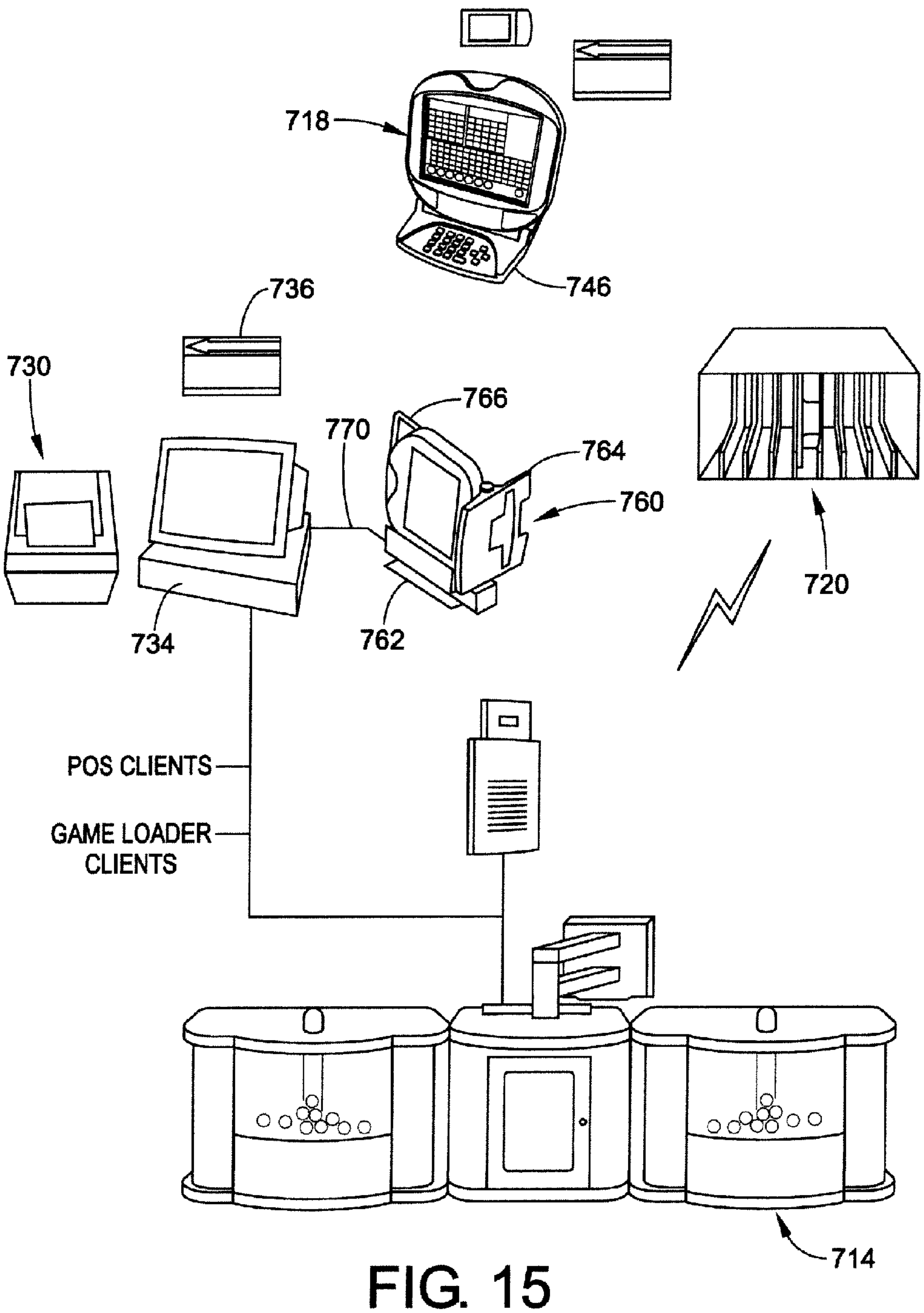
FIG. 15 is a schematic of a gaming system according to a yet further embodiment of the present invention; and, FIG. 16 is a schematic of a game system according to still another embodiment of the present invention.
Figure 16:
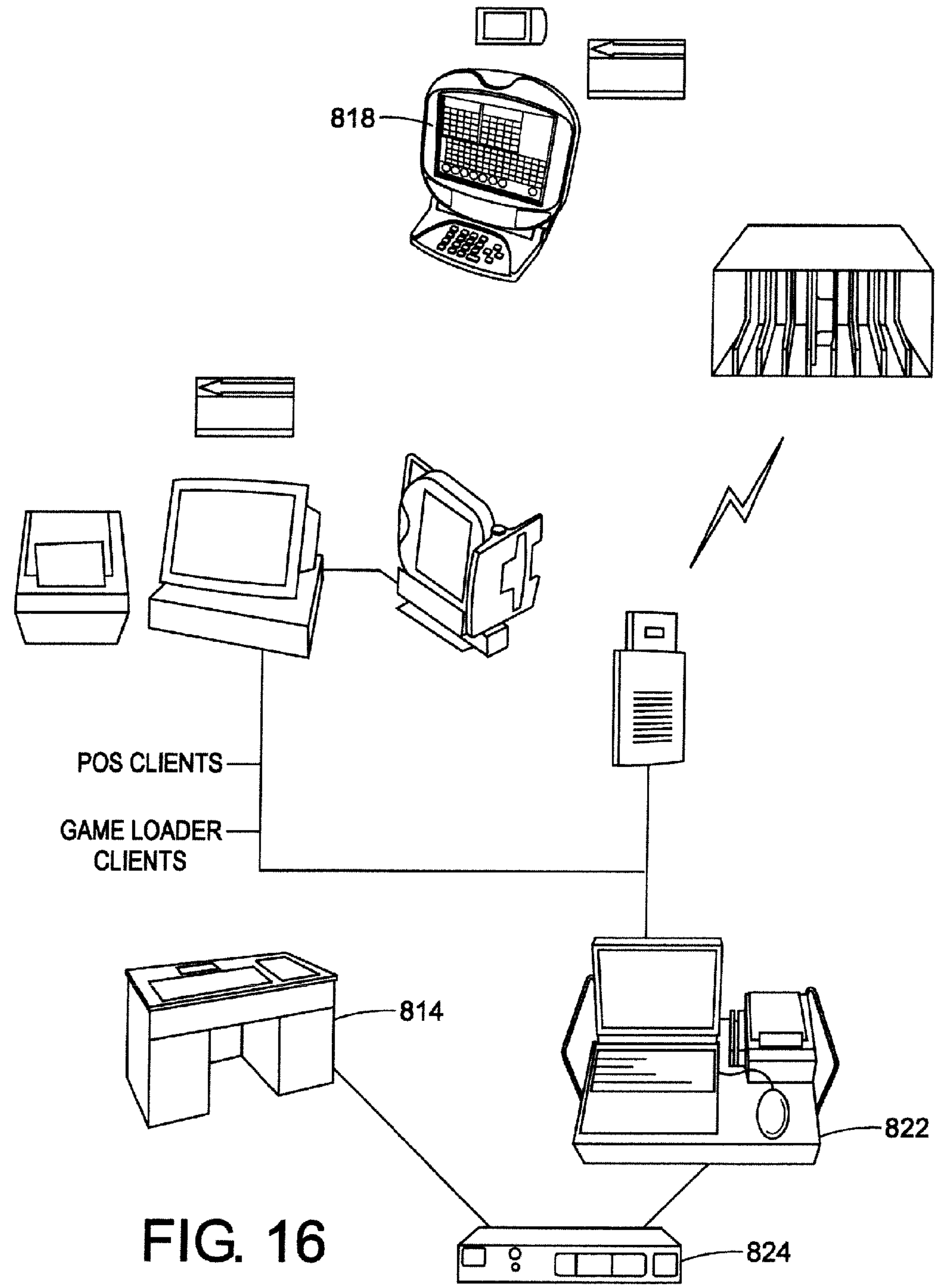

Additional aspects of the present invention are shown in FIGS. 15 and 16. As shown in FIG. 15, the POS components can further include an infrared (IR) cradle 760. The infrared cradle includes a base 762, a side wall 764 and a back wall 766. The base includes a slot dimensioned to receive the display the gaming unit 718, laid on its side.

As previously described, a player rents the gaming unit 718 from a worker at the bingo hall while the unit is being stored in the kiosk 720 in sleep mode. The player or worker removes the gaming unit from the kiosk and then positions the gaming unit in the cradle 760. In particular, the gaming unit is turned on its side such that the display can be positioned in the slot of the base 762. In this side position, the keyboard 746 is adjacent the side wall 764. The plurality of gaming units 718 include an IR input which can be accessed when positioned in the cradle. A wire 770 has one end connected to an input located on the PC-compatible computer 734 and the other end connected to the IR input of the gaming unit.

In order to rent the gaming unit, the player provides the worker with his or her player card 736. The player again purchases a prepackaged set of electronic bingo cards and receives a receipt form the receipt printer 730 evidencing same. When a player buys a prepackaged set of electronic bingo cards, the PC-compatible computer 734 downloads the prepackaged set of electronic bingo cards into the gaming unit 718 mounted in the cradle 760 via the IR connection. The bingo hall operator can then take the downloaded unit out of the cradle and give it to a player who can take it to any location of the bingo hall.

Each gaming unit 718 receives data, such as bingo patterns and bingo numbers from a master game controller via the secure communication network. As shown in FIG. 15, the master game controller 714 can be housed in a gaming machine. Alternatively, and as shown in FIG. 16, a master game controller 822 can be separately connected to a conventional gaming machine 814, via a data router 824. In both gaming systems, the master game controller stores gaming data and communicates the data with the plurality of gaming units 718, 818, via a secure communication network.

As is evident from the present disclosure, the RGU 1 incorporates a large, bright, multicolor dome light assembly 7 that can be easily seen by gaming operators in a bingo facility. The facility can be at least a 26,000 square foot area. The dome light assembly provides an indication means of bingo gaming wins, needed player assistance and player location. The dome light assembly can be used directly as an element of a game other than bingo, such as the above described raffle-like game.

The RGU 1, positioned for game play, incorporates a display 6 and touch panel 5 mounted in the near vertical plane with an attached base 3 or support base 10 mounted in the horizontal plane. A support handle 21 secures the display and touch panel to the keyboard or support base. The keyboard or support base and the handle have the ability to pivot to a transport or charging position. The transport or charging position is defined by the keyboard or support base and handle both being in a plane parallel to a plane defined by the display and touch panel.

The RGU 1 includes primary and secondary computers 100 and 102, respectively. These are interactively in communication with each other to achieve suspend and resume operations of the primary processor. The secondary computer can have control over the power regulators to reset the primary computer. The secondary computer can set periodic wakeup calls for the primary computer from a low power suspend state to make the RGU be periodically responsive to network operations.

The portable RGU can have a magnetic card reader 4, or smart card reader, or biometric reader integrated into the housing 2 for security and easy player identification. This enables the use of monetary credits.

The RGU can automatically determine the source of input power, battery or AC line, and accordingly, execute two different state diagrams. A battery powered RGU can execute a state diagram that includes a means for Run, Screen Saver, De-activated, Suspend, Low Power/Reset states. The state diagram is responsive to keyboard or base position, and insertion into a charger. An AC line powered RGU can execute a state diagram that includes a means for Run, Screen Saver, Suspend, Low Power/Reset states. In this state, the state diagram is not responsive to keyboard or base position.

If desired, the RGU 1 can, unsolicited, periodically identify itself, its configuration, and battery data via the networked system, before, during, and after an active gaming session, for purpose of automatic RGU inventory management and battery life cycle management.

The RGU 1 can safeguard against low battery conditions during gaming by interrogating remaining battery capacity from an intelligent battery pack and comparing the remaining capacity against an active session duration value that was loaded into the RGU with the gaming package during the active session, proactively preventing the gaming package from executing on that gaming unit.

The RGU 1 can employ plug-in radio and memory cards that are accessible without disassembly of the gaming unit's housing.

The RGU 1 can be provided with rubber shock mount means to allow shock dampening to an entire subassembly including a display and touch panel, together, rigidly mounted to a computer circuit board.

The use of a State (of the U.S.) Configuration means on a CD or other removable storage media, in conjunction with resident Console, POS, and RGU programs, will allow an operator to select a given State from a list of States. The system then automatically configures itself and places operator restrictions on the setup and sales operations of the Console, POS, and RGU, to conform to State specific data contained on the CD or other removable storage media.

The disclosure has been described with reference to the preferred embodiments. Obviously, modifications and alterations will occur to others upon reading and understanding the preceding detailed description. It is intended that the disclosure be construed as including all such modifications and alterations insofar as they come within the scope of the appended claims or the equivalents thereof.

What is claimed is:

1. A method for playing a game of chance, comprising:

providing a plurality of separate gaming units, each unit comprising at least two indicator lights, each indicator light illuminating in a separate color, and each color being related to a separate gaming level;

providing for operators of gaming units to each purchase at least one raffle chance for only a single gaming level during the game of chance;

instructing at least some of the plurality of gaming units to illuminate a respective one of their at least two indicator lights to shine with a selected gaming level color;

progressively reducing a number of gaming units that have an indicator light illuminated, comprising randomly reducing, one at a time, the number of gaming units that have an indicator light illuminated until only one of the gaming units remains illuminated with each gaming level color to designate a winner at a gaming level corresponding to the gaming level color; and providing an award to the operators of each such gaming unit.

2. The method of claim 1, wherein the award is based on a number of raffle chances purchased by the holder for the respective one of the different colors.

3. The method of claim 2, wherein when plural raffle chances are purchased for a given one of the gaming units, the raffle chances are restricted to a single gaming level color award.

4. The method of claim 1, further comprising:

automatically computing a payout amount for the award based on a total number of raffle chances purchased for that award.

5. The method of claim 1, further comprising a central console, wherein the central console communicates wirelessly with the gaming units during the step of instructing.

6. The method of claim 5, wherein the central console and the gaming units are linked by a secure network for communicating the instructions.

7. The method of claim 5, further comprising:

automatically computing a payout amount for each of a plurality of awards based on a total number of raffle chances purchased for that award, each award being associated with a respective gaming level color, the computing being performed by the central console.

8. The method of claim 5, wherein each raffle chance is linked to an ID which is stored in the central console and printed on a receipt, and the method further comprises verifying the award by comparing the ID on the receipt with the ID stored in the central console.

9. The method of claim 8, wherein the central console causes the ID to be displayed on the gaming unit and the method further comprises verifying the award by comparing the ID on the receipt with the ID displayed on the gaming unit.

10. The method of claim 8, further comprising storing the ID in the central console a number of times corresponding to a number of raffle chances purchased.

11. The method of claim 8, wherein each gaming unit is configured for playing a bingo-type game and the receipt is for a purchased bingo package.

12. The method of claim 1, further comprising playing a bingo game with the gaming units.

13. The method of claim 1, wherein the gaming units are portable gaming units.

14. The method of claim 1, wherein there are three different gaming level colors.

15. the method of claim 14, wherein one of the colors is formed by contemporaneously illuminating indicator lights of two different colors.

16. The method of claim 1, wherein the at least one indicator light comprises a red light-emitting diode and a green light-emitting diode, and wherein the red and green light-emitting diodes each singly illuminate respective first and second colors and, in combination, illuminate a third color, each of the three colors being indicative of an award.

17. The method of claim 16, further comprising, providing for holders of the gaming units to purchase raffle chances prior to the commencement of the game, each raffle chance being associated with a selected one of the awards.

18. The method of claim 16, further comprising, determining a different award level for each of the colors prior to instructing the gaming units to illuminate.

19. The method of claim 1, wherein the step of instructing the plurality of gaming units to illuminate their respective at least one indicator light comprises:

blinking the at least one indicator light.

20. The method of claim 1, wherein a payout amount for each level is automatically calculated based on raffle sales dollars collected up to the point the game starts.

21. The method of claim 1, wherein two indicator lights of different colors are provided for each gaming unit and at least two separate awards are provided, one for each color of light.

22. The method of claim 21, wherein two indicator lights of different colors are provided for each gaming unit and at least two separate awards are provided, one for each color of light.

23. A method for playing a game of chance comprising:

providing a central console and a plurality of gaming units communicating with the central console, each gaming unit comprising a least one indicator light;

instructing the plurality of gaming units, via the central console, to illuminate their respective at least one indicator light;

progressively reducing the number of gaming units that have their at least one light illuminated until only a selected number of gaming units remain with their at least one light being illuminated, the step of progressively reducing a number of gaming units that have their at least one light illuminated comprising:

randomly reducing, one at a time, the number of gaming units that have their at least one light illuminated; and, providing an award to each of the operators of those selected number of gaming units which remain with their at least one light being illuminated, a payout amount for each award being automatically calculated based on the amount of money collected for the game.

24. In a combination of a central console and a multiplicity of portable gaming units, each of the gaming units including a plurality of randomly actuable lights which illuminate with different colors, a method of playing a game of chance, comprising:

causing the central console to communicate with the portable gaming units to instruct the portable gaming units to blink the indicator lights at random times on randomly selected portable gaming units to illuminate different colors; and progressively reducing a number of the portable gaming units that are blinking until, for each of the different colors, a single one of the portable gaming units remains illuminated in each respective one of the different colors, each of the colors being indicative of a respective award level for the game, a payout amount for each award level being automatically calculated based on raffle sales dollars collected for the game, the step of progressively reducing a number of gaming units that have their at least one light illuminated comprising:

randomly reducing, one at a time, the number of gaming units that have their at least one light illuminated.

25. A method for playing a game of chance, comprising:

providing a plurality of separate gaming units, each unit comprising at least one indicator light;

providing for an operator of one of the gaming units to purchase at least one raffle chance for a gaming level, the raffle chances for a gaming unit being restricted to a single gaming level color award;

collecting money for the sales of raffle chances;

instructing at least some of the plurality of gaming units to illuminate their respective at least one indicator light to shine with a gaming level color;

progressively reducing a number of gaming units that have their at least one light illuminated, comprising randomly reducing, one at a time, the number of gaming units that have their at least one light illuminated until only one of the gaming units remains with its at least one light being illuminated with the gaming level color to designate a winner at a gaming level corresponding to the gaming level color;

automatically computing a payout amount for an award at the gaming level corresponding to the gaming level color based on a total number of raffle chances purchased by the operator for that gaming level color award and raffle sales money collected; and providing the award to the operator of the one gaming unit.

* * * * *